(12) United States Patent
Havekost et al.

(10) Patent No.: US 8,000,814 B2
(45) Date of Patent: Aug. 16, 2011

(54) USER CONFIGURABLE ALARMS AND ALARM TRENDING FOR PROCESS CONTROL SYSTEM

(75) Inventors: Robert B. Havekost, Austin, TX (US); Mark J. Nixon, Round Rock, TX (US)

(73) Assignee: Fisher-Rosemount Systems, Inc., Austin, TX (US)

(*) Notice: Subject to any disclaimer, the term of this patent is extended or adjusted under 35 U.S.C. 154(b) by 455 days.

(21) Appl. No.: 10/574,570

(22) PCT Filed: May 4, 2005

(86) PCT No.: PCT/US2005/015537
§ 371 (c)(1),
(2), (4) Date: Aug. 18, 2008

(87) PCT Pub. No.: WO2005/109126
PCT Pub. Date: Nov. 17, 2005

(65) Prior Publication Data
US 2008/0300698 A1    Dec. 4, 2008

Related U.S. Application Data

(60) Provisional application No. 60/567,980, filed on May 4, 2004.

(51) Int. Cl.
*G05B 11/01* (2006.01)
*G06F 3/01* (2006.01)
(52) U.S. Cl. ............ 700/17; 340/3.1; 340/3.7; 715/771; 715/772; 700/18; 700/80; 700/83
(58) Field of Classification Search ............ 700/17, 700/80, 83, 266, 19, 21, 26, 27, 32, 33; 702/183, 702/185; 340/3.7, 500, 815.4, 825.36, 3.1; 715/772

See application file for complete search history.

(56) References Cited

U.S. PATENT DOCUMENTS

| RE30,280 E | 5/1980 | Berman et al. |
|---|---|---|
| 4,244,385 A | 1/1981 | Hotine |
| 4,506,324 A | 3/1985 | Healy |
| 4,512,747 A | 4/1985 | Hitchens et al. |
| 4,628,435 A | 12/1986 | Tashiro et al. |

(Continued)

FOREIGN PATENT DOCUMENTS

CN    1130430A A    9/1996

(Continued)

OTHER PUBLICATIONS

CAMO product datasheet, "The Unscrambler 9.6," www.camo.com.

(Continued)

*Primary Examiner* — Dave Robertson
(74) *Attorney, Agent, or Firm* — Marshall, Gerstein & Borun LLP

(57) ABSTRACT

Various graphical displays for plant process operators are provided which combine aspects of alarm priority and alarm age to assist operators in making better choices in responding to alarms. The disclosed graphical displays provide improved contextual information about specific alarms and the relationships with other alarms in the same control module, equipment module, etc. Hierarchically organized presentations of active alarms and alarm age profiles are also provided to assist operators in evaluating causes of "alarm floods" in chain reactions within complex process environments. Various types of alarm or display alerts are also provided for improved monitoring of processed conditions and changes in process controls.

19 Claims, 12 Drawing Sheets

U.S. PATENT DOCUMENTS

| | | | |
|---|---|---|---|
| 4,663,704 A | 5/1987 | Jones et al. | |
| 4,736,320 A | 4/1988 | Bristol | |
| 4,843,538 A | 6/1989 | Lane et al. | |
| 4,885,717 A | 12/1989 | Beck et al. | |
| 4,972,328 A | 11/1990 | Wu et al. | |
| 4,977,529 A | 12/1990 | Gregg et al. | |
| 4,985,857 A | 1/1991 | Bajpai et al. | |
| 5,014,208 A | 5/1991 | Wolfson | |
| 5,021,947 A | 6/1991 | Campbell et al. | |
| 5,041,964 A | 8/1991 | Cole et al. | |
| 5,051,898 A | 9/1991 | Wright et al. | |
| 5,079,731 A | 1/1992 | Miller et al. | |
| 5,092,449 A | 3/1992 | Bolin et al. | |
| 5,097,412 A | 3/1992 | Orimo et al. | |
| 5,119,468 A | 6/1992 | Owens | |
| 5,168,441 A | 12/1992 | Onarheim et al. | |
| 5,218,709 A | 6/1993 | Fijany et al. | |
| 5,268,834 A | 12/1993 | Sanner et al. | |
| 5,321,829 A | 6/1994 | Zifferer | |
| 5,347,446 A | 9/1994 | Iino et al. | |
| 5,347,466 A | 9/1994 | Nichols et al. | |
| 5,361,198 A | 11/1994 | Harmon et al. | |
| 5,408,412 A | 4/1995 | Hogg et al. | |
| 5,408,603 A | 4/1995 | Van de Lavoir et al. | |
| 5,421,017 A | 5/1995 | Scholz et al. | |
| 5,428,555 A | 6/1995 | Starkey et al. | |
| 5,485,600 A | 1/1996 | Joseph et al. | |
| 5,485,620 A | 1/1996 | Sadre et al. | |
| 5,499,333 A | 3/1996 | Doudnikoff et al. | |
| 5,509,116 A | 4/1996 | Hiraga et al. | |
| 5,530,643 A | 6/1996 | Hodorowski | |
| 5,546,301 A | 8/1996 | Agrawal et al. | |
| 5,555,385 A | 9/1996 | Osisek | |
| 5,576,946 A | 11/1996 | Bender et al. | |
| 5,594,858 A | 1/1997 | Blevins | |
| 5,603,018 A | 2/1997 | Terada et al. | |
| 5,611,059 A | 3/1997 | Benton et al. | |
| 5,631,825 A | 5/1997 | van Weele et al. | |
| 5,680,409 A | 10/1997 | Qin et al. | |
| 5,706,455 A | 1/1998 | Benton et al. | |
| 5,752,008 A | 5/1998 | Bowling | |
| 5,768,119 A * | 6/1998 | Havekost et al. | 700/4 |
| 5,782,330 A | 7/1998 | Mehlert et al. | |
| 5,796,602 A | 8/1998 | Wellan et al. | |
| 5,801,942 A | 9/1998 | Nixon et al. | |
| 5,806,053 A | 9/1998 | Tresp et al. | |
| 5,812,394 A | 9/1998 | Lewis et al. | |
| 5,818,736 A | 10/1998 | Leibold | |
| 5,821,934 A | 10/1998 | Kodosky et al. | |
| 5,826,060 A | 10/1998 | Santoline et al. | |
| 5,828,851 A | 10/1998 | Nicon et al. | |
| 5,838,563 A | 11/1998 | Dove et al. | |
| 5,841,654 A | 11/1998 | Verissimo et al. | |
| 5,857,102 A | 1/1999 | McChesney et al. | |
| 5,862,052 A | 1/1999 | Nixon et al. | |
| 5,892,939 A | 4/1999 | Call et al. | |
| 5,898,860 A | 4/1999 | Leibold | |
| 5,901,313 A | 5/1999 | Wolf et al. | |
| 5,903,455 A | 5/1999 | Sharpe, Jr. et al. | |
| 5,909,368 A | 6/1999 | Nixon et al. | |
| 5,909,916 A | 6/1999 | Foster et al. | |
| 5,926,177 A | 7/1999 | Hatanaka et al. | |
| 5,929,855 A | 7/1999 | Benton et al. | |
| 5,940,294 A | 8/1999 | Dove | |
| 5,950,006 A | 9/1999 | Crater et al. | |
| 5,960,214 A | 9/1999 | Sharpe, Jr. et al. | |
| 5,970,430 A | 10/1999 | Burns et al. | |
| 5,980,078 A | 11/1999 | Krivoshein et al. | |
| 5,995,753 A | 11/1999 | Walker | |
| 5,995,916 A | 11/1999 | Nixon et al. | |
| 6,003,037 A | 12/1999 | Kassabgi et al. | |
| 6,023,644 A | 2/2000 | Kinsman | |
| 6,028,998 A | 2/2000 | Gloudeman et al. | |
| 6,032,208 A | 2/2000 | Nixon et al. | |
| 6,041,171 A | 3/2000 | Blaisdell et al. | |
| 6,052,130 A | 4/2000 | Bardon et al. | |
| 6,078,320 A | 6/2000 | Dove et al. | |
| 6,094,600 A | 7/2000 | Sharpe, Jr. et al. | |
| 6,098,116 A | 8/2000 | Nixon et al. | |
| 6,138,174 A | 10/2000 | Keeley | |
| 6,146,143 A | 11/2000 | Huston et al. | |
| 6,157,864 A | 12/2000 | Schwenke et al. | |
| 6,161,051 A | 12/2000 | Hafemann et al. | |
| 6,167,316 A | 12/2000 | Gloudeman et al. | |
| 6,173,208 B1 | 1/2001 | Park et al. | |
| 6,178,393 B1 | 1/2001 | Irvin | |
| 6,192,390 B1 | 2/2001 | Berger et al. | |
| 6,195,591 B1 | 2/2001 | Nixon et al. | |
| 6,201,996 B1 | 3/2001 | Crater et al. | |
| 6,233,586 B1 | 5/2001 | Chang et al. | |
| 6,268,853 B1 | 7/2001 | Hoskins et al. | |
| 6,298,454 B1 | 10/2001 | Schleiss et al. | |
| 6,362,839 B1 | 3/2002 | Hamilton et al. | |
| 6,366,272 B1 | 4/2002 | Rosenberg et al. | |
| 6,385,496 B1 | 5/2002 | Irwin et al. | |
| 6,396,516 B1 | 5/2002 | Beatty | |
| 6,415,418 B1 | 7/2002 | McLaughlin et al. | |
| 6,421,571 B1 * | 7/2002 | Spriggs et al. | 700/17 |
| 6,442,512 B1 | 8/2002 | Sengupta et al. | |
| 6,442,515 B1 | 8/2002 | Varma et al. | |
| 6,445,963 B1 | 9/2002 | Blevins et al. | |
| 6,449,624 B1 | 9/2002 | Hammack et al. | |
| 6,477,435 B1 | 11/2002 | Ryan et al. | |
| 6,477,527 B2 | 11/2002 | Carey et al. | |
| 6,480,860 B1 | 11/2002 | Monday | |
| 6,505,519 B2 | 1/2003 | Henry et al. | |
| 6,510,351 B1 | 1/2003 | Blevins et al. | |
| 6,515,683 B1 | 2/2003 | Wright | |
| 6,522,934 B1 | 2/2003 | Irwin et al. | |
| 6,535,122 B1 * | 3/2003 | Bristol | 340/506 |
| 6,546,297 B1 | 4/2003 | Gaston et al. | |
| 6,571,133 B1 | 5/2003 | Mandl et al. | |
| 6,577,908 B1 | 6/2003 | Wojsznis et al. | |
| 6,587,108 B1 | 7/2003 | Guerlain et al. | |
| 6,615,090 B1 | 9/2003 | Blevins et al. | |
| 6,618,630 B1 * | 9/2003 | Jundt et al. | 700/17 |
| 6,618,745 B2 | 9/2003 | Christensen et al. | |
| 6,633,782 B1 | 10/2003 | Schleiss et al. | |
| 6,646,545 B2 | 11/2003 | Bligh | |
| 6,647,315 B1 | 11/2003 | Sherriff et al. | |
| 6,668,257 B1 | 12/2003 | Greef et al. | |
| 6,684,261 B1 | 1/2004 | Orton et al. | |
| 6,684,385 B1 | 1/2004 | Bailey et al. | |
| 6,687,698 B1 | 2/2004 | Nixon et al. | |
| 6,691,280 B1 | 2/2004 | Dove et al. | |
| 6,704,737 B1 | 3/2004 | Nixon et al. | |
| 6,711,629 B1 | 3/2004 | Christensen et al. | |
| 6,758,102 B2 | 7/2004 | Henry et al. | |
| 6,760,711 B1 | 7/2004 | Gillett et al. | |
| 6,788,980 B1 | 9/2004 | Johnson | |
| 6,795,798 B2 | 9/2004 | Eryurek et al. | |
| 6,810,337 B1 * | 10/2004 | Ashcraft et al. | 702/51 |
| 6,826,521 B1 | 11/2004 | Hess et al. | |
| 6,904,415 B2 | 6/2005 | Krahn et al. | |
| 6,948,173 B1 | 9/2005 | Isom | |
| 6,957,110 B2 | 10/2005 | Wewalaarachchi et al. | |
| 6,973,508 B2 | 12/2005 | Shepard et al. | |
| 6,981,424 B2 | 1/2006 | Henry et al. | |
| 7,043,311 B2 | 5/2006 | Nixon et al. | |
| 7,050,083 B2 | 5/2006 | Yoo et al. | |
| 7,050,863 B2 | 5/2006 | Mehta et al. | |
| 7,062,718 B2 | 6/2006 | Kodosky et al. | |
| 7,065,476 B2 | 6/2006 | Dessureault et al. | |
| 7,086,009 B2 | 8/2006 | Resnick et al. | |
| 7,110,835 B2 | 9/2006 | Blevins et al. | |
| 7,113,834 B2 | 9/2006 | Wojsznis et al. | |
| 7,117,052 B2 | 10/2006 | Lucas et al. | |
| 7,146,231 B2 | 12/2006 | Schleiss et al. | |
| 7,165,226 B2 | 1/2007 | Thurner et al. | |
| 7,210,039 B2 | 4/2007 | Rodgers et al. | |
| 7,210,095 B1 | 4/2007 | Mor | |
| 7,219,306 B2 | 5/2007 | Kodosky et al. | |
| 7,234,138 B2 | 6/2007 | Crevatin | |
| 7,308,473 B1 | 12/2007 | Thomas et al. | |
| 7,320,005 B2 | 1/2008 | Li et al. | |
| 7,330,768 B2 | 2/2008 | Scott et al. | |
| 7,376,661 B2 | 5/2008 | Larson | |

| | | | |
|---|---|---|---|
| 7,404,476 B2 | 7/2008 | Yoshida | |
| 7,526,347 B2 | 4/2009 | Lucas et al. | |
| 7,634,384 B2* | 12/2009 | Eryurek et al. | 702/182 |
| 7,647,126 B2 | 1/2010 | Blevins et al. | |
| 7,647,558 B2 | 1/2010 | Ucar et al. | |
| 7,680,546 B2 | 3/2010 | Gilbert et al. | |
| 7,702,409 B2 | 4/2010 | Lucas et al. | |
| 7,703,032 B2 | 4/2010 | Wells | |
| 7,707,550 B2 | 4/2010 | Resnick et al. | |
| 7,890,927 B2* | 2/2011 | Eldridge et al. | 717/110 |
| 2001/0007984 A1 | 7/2001 | Fattah et al. | |
| 2001/0010053 A1 | 7/2001 | Ben-Shachar et al. | |
| 2001/0051949 A1 | 12/2001 | Carey et al. | |
| 2002/0004796 A1 | 1/2002 | Vange et al. | |
| 2002/0010571 A1 | 1/2002 | Daniel et al. | |
| 2002/0019672 A1 | 2/2002 | Paunonen | |
| 2002/0022894 A1 | 2/2002 | Eryurek et al. | |
| 2002/0022895 A1 | 2/2002 | Genise et al. | |
| 2002/0046290 A1 | 4/2002 | Andersson et al. | |
| 2002/0050926 A1* | 5/2002 | Lewis et al. | 340/506 |
| 2002/0055790 A1 | 5/2002 | Havekost | |
| 2002/0059282 A1 | 5/2002 | Andersson et al. | |
| 2002/0077711 A1 | 6/2002 | Nixon et al. | |
| 2002/0123864 A1 | 9/2002 | Eryurek et al. | |
| 2002/0156872 A1 | 10/2002 | Brown | |
| 2002/0184521 A1 | 12/2002 | Lucovsky et al. | |
| 2002/0184610 A1 | 12/2002 | Chong et al. | |
| 2002/0193888 A1 | 12/2002 | Wewalaarachchi et al. | |
| 2002/0199123 A1 | 12/2002 | McIntyre et al. | |
| 2003/0005169 A1 | 1/2003 | Perks et al. | |
| 2003/0009754 A1 | 1/2003 | Rowley et al. | |
| 2003/0014500 A1 | 1/2003 | Schleiss et al. | |
| 2003/0028269 A1 | 2/2003 | Spriggs et al. | |
| 2003/0028683 A1 | 2/2003 | Yorke et al. | |
| 2003/0033037 A1 | 2/2003 | Yuen et al. | |
| 2003/0041130 A1 | 2/2003 | Harrisville-Wolff et al. | |
| 2003/0084201 A1 | 5/2003 | Edwards et al. | |
| 2003/0126136 A1 | 7/2003 | Omoigui | |
| 2003/0153988 A1 | 8/2003 | Shepard et al. | |
| 2003/0191803 A1 | 10/2003 | Chinnici et al. | |
| 2003/0200062 A1 | 10/2003 | Dessureault et al. | |
| 2003/0226009 A1 | 12/2003 | Maeda et al. | |
| 2003/0236576 A1 | 12/2003 | Resnick et al. | |
| 2003/0236577 A1 | 12/2003 | Clinton | |
| 2004/0021679 A1 | 2/2004 | Chapman et al. | |
| 2004/0036698 A1 | 2/2004 | Thurner et al. | |
| 2004/0051739 A1* | 3/2004 | Schmickley et al. | 345/772 |
| 2004/0059929 A1 | 3/2004 | Rodgers et al. | |
| 2004/0075689 A1 | 4/2004 | Schleiss et al. | |
| 2004/0075857 A1 | 4/2004 | Akiyoshi et al. | |
| 2004/0078182 A1 | 4/2004 | Nixon et al. | |
| 2004/0133487 A1 | 7/2004 | Hanagan et al. | |
| 2004/0153804 A1 | 8/2004 | Blevins et al. | |
| 2004/0162792 A1 | 8/2004 | Satou et al. | |
| 2004/0181746 A1 | 9/2004 | McLure et al. | |
| 2004/0186927 A1 | 9/2004 | Eryurek et al. | |
| 2004/0199925 A1 | 10/2004 | Nixon et al. | |
| 2004/0205656 A1 | 10/2004 | Reulein et al. | |
| 2004/0249483 A1 | 12/2004 | Wojsznis et al. | |
| 2004/0267515 A1 | 12/2004 | McDaniel et al. | |
| 2005/0005079 A1 | 1/2005 | Boudou et al. | |
| 2005/0015439 A1 | 1/2005 | Balaji et al. | |
| 2005/0027376 A1 | 2/2005 | Lucas et al. | |
| 2005/0039034 A1 | 2/2005 | Doyle et al. | |
| 2005/0062677 A1 | 3/2005 | Nixon et al. | |
| 2005/0096872 A1 | 5/2005 | Blevins et al. | |
| 2005/0164684 A1 | 7/2005 | Chen et al. | |
| 2005/0182758 A1 | 8/2005 | Seitz et al. | |
| 2005/0197786 A1 | 9/2005 | Kataria et al. | |
| 2005/0197803 A1 | 9/2005 | Eryurek et al. | |
| 2005/0197805 A1 | 9/2005 | Eryurek et al. | |
| 2005/0197806 A1 | 9/2005 | Eryurek et al. | |
| 2005/0217971 A1 | 10/2005 | Kim | |
| 2005/0222698 A1 | 10/2005 | Eryurek et al. | |
| 2005/0277403 A1 | 12/2005 | Schmidt et al. | |
| 2006/0031354 A1 | 2/2006 | Patrick et al. | |
| 2006/0031481 A1 | 2/2006 | Patrick et al. | |
| 2006/0136555 A1 | 6/2006 | Patrick et al. | |
| 2006/0259524 A1 | 11/2006 | Horton | |
| 2007/0006149 A1 | 1/2007 | Resnick et al. | |
| 2007/0061786 A1 | 3/2007 | Zhou et al. | |
| 2007/0078529 A1 | 4/2007 | Thiele et al. | |
| 2007/0129917 A1 | 6/2007 | Blevins et al. | |
| 2007/0156264 A1 | 7/2007 | Schleiss et al. | |
| 2007/0165031 A1 | 7/2007 | Gilbert et al. | |
| 2007/0170037 A1 | 7/2007 | Kuroda | |
| 2007/0211079 A1 | 9/2007 | Nixon et al. | |
| 2007/0244582 A1 | 10/2007 | Wolf | |
| 2007/0282480 A1 | 12/2007 | Pannese et al. | |
| 2008/0034367 A1 | 2/2008 | Patrick et al. | |
| 2008/0116035 A1 | 5/2008 | Ogimura | |
| 2008/0140760 A1 | 6/2008 | Conner et al. | |
| 2010/0168874 A1 | 7/2010 | Lucas et al. | |

FOREIGN PATENT DOCUMENTS

| | | | |
|---|---|---|---|
| CN | 101833289 A | 9/2010 | |
| CN | 101893861 A | 11/2010 | |
| EP | 0 482 523 A2 | 4/1992 | |
| EP | 0813129 | 12/1997 | |
| EP | 1 030 251 A1 | 8/2000 | |
| EP | 1122652 | 8/2001 | |
| EP | 1 204 033 | 5/2002 | |
| EP | 1 284 446 | 2/2003 | |
| EP | 1 538 619 A1 | 6/2005 | |
| GB | 2083258 A * | 3/1982 | |
| GB | 2 328 523 | 2/1999 | |
| GB | 2 370 665 | 7/2000 | |
| GB | 2 348 020 | 9/2000 | |
| GB | 2349958 | 11/2000 | |
| GB | 2 355 545 A | 4/2001 | |
| GB | 2 371 884 | 8/2002 | |
| GB | 2372365 | 8/2002 | |
| GB | 2 377 045 | 12/2002 | |
| GB | 2 395 801 | 6/2004 | |
| GB | 2 398 659 | 8/2004 | |
| GB | 2 415 809 A | 1/2006 | |
| GB | 2 417 574 | 3/2006 | |
| GB | 2 417 575 | 3/2006 | |
| GB | 2 418 030 | 3/2006 | |
| GB | 2 418 031 | 3/2006 | |
| GB | 2 429 388 A | 2/2007 | |
| GB | 2 446 343 A | 8/2008 | |
| JP | 1-298389 | 12/1979 | |
| JP | 60-75909 A | 4/1985 | |
| JP | 1-116706 A | 5/1989 | |
| JP | 1-120593 | 5/1989 | |
| JP | 01116706 | 5/1989 | |
| JP | 1-241589 A | 9/1989 | |
| JP | 2-310602 | 12/1990 | |
| JP | 3-257509 | 11/1991 | |
| JP | 5-54277 | 3/1993 | |
| JP | 5-079858 A | 3/1993 | |
| JP | 6-26093 | 2/1994 | |
| JP | 6-044479 A | 2/1994 | |
| JP | 6-274297 A | 9/1994 | |
| JP | 7-036538 | 2/1995 | |
| JP | 7-248941 | 9/1995 | |
| JP | 8-190422 A | 7/1996 | |
| JP | 8-314760 | 11/1996 | |
| JP | 9-134213 A | 5/1997 | |
| JP | 9-330013 | 12/1997 | |
| JP | 10-505179 T | 5/1998 | |
| JP | 10-149207 A | 6/1998 | |
| JP | 11-007315 A | 1/1999 | |
| JP | 11-345023 A | 12/1999 | |
| JP | 2000-050531 | 2/2000 | |
| JP | 2000-249782 A | 9/2000 | |
| JP | 2000-259228 A | 9/2000 | |
| JP | 2000-311004 | 11/2000 | |
| JP | 2000-346299 A | 12/2000 | |
| JP | 2001-195121 A | 7/2001 | |
| JP | 2002-108600 A | 4/2002 | |
| JP | 2002-140114 | 5/2002 | |
| JP | 2002-215221 A | 7/2002 | |
| JP | 2002-258936 A | 9/2002 | |
| JP | 2002-268737 A | 9/2002 | |
| JP | 2002-303564 | 10/2002 | |
| JP | 2003-257509 A | 9/2003 | |

| | | |
|---|---|---|
| JP | 2004-199655 A | 7/2004 |
| JP | 2003-34629 A | 9/2004 |
| JP | 9-288512 | 11/2007 |
| JP | 9-500996 T | 1/2009 |
| WO | WO-91/19237 A1 | 12/1991 |
| WO | WO-95/04314 | 2/1995 |
| WO | WO-97/27540 A1 | 7/1997 |
| WO | WO-97/38362 | 10/1997 |
| WO | WO-97/45778 | 12/1997 |
| WO | WO-98/53398 | 11/1998 |
| WO | WO-00/23798 | 4/2000 |
| WO | WO-00/70417 | 11/2000 |
| WO | WO-01/09690 | 2/2001 |
| WO | WO-01/65322 A1 | 9/2001 |
| WO | WO-02/071169 | 9/2002 |
| WO | WO-03/003198 | 1/2003 |
| WO | WO-03/038584 | 5/2003 |
| WO | WO-03/048922 A1 | 6/2003 |
| WO | WO-03/075206 | 9/2003 |
| WO | WO-03/075206 A2 | 9/2003 |
| WO | WO-2004/025437 A2 | 3/2004 |
| WO | WO-2004/086160 A1 | 10/2004 |
| WO | WO-2005/107409 | 11/2005 |
| WO | WO-2005/107410 | 11/2005 |
| WO | WO-2005/107416 | 11/2005 |
| WO | WO-2005/109122 | 11/2005 |
| WO | WO-2005/109123 | 11/2005 |
| WO | WO-2005/109124 | 11/2005 |
| WO | WO-2005/109125 | 11/2005 |
| WO | WO-2005/109126 | 11/2005 |
| WO | WO-2005/109127 | 11/2005 |
| WO | WO-2005/109128 | 11/2005 |
| WO | WO-2005/109129 | 11/2005 |
| WO | WO-2005/109130 | 11/2005 |
| WO | WO-2005/109131 | 11/2005 |
| WO | WO-2005/109250 | 11/2005 |
| WO | WO-2005/119381 | 12/2005 |
| WO | WO-2007/067645 | 6/2007 |

OTHER PUBLICATIONS

Developers.sun.com, "Core J2EE Patterns—Data Access Object," *CORE J2EE Pattern Catalog* (2004). Retrieved from the Internet on Feb. 1, 2006: <URL: http://web.archive.org/web/20040414043406/java.sun.com/blueprints/corej2eepatterns/Patterns/DataAccessObjects.html>.

Han et al., "Web Based rSPC (realtime Statistical Process Control) System Supporting XML Protocol," *ISIE*, vol. 1, pp. 399-403 (2001).

Mehta et al., "Feedfoward Neural Networks for Process Identification and Prediction," Neural Network and Experty Systems Presentation (2001).

Mohr et al., "BizTalk and Application Integration—Translating Between Message Specification: BizTalk Mapper," *Professional BizTalk*, pp. 1-3 (2001).

StatSoft product datasheet, "Statistica, Multivariate Statistical Process Control," www.statsoft.com.

Tzovla et al., "Abnormal Condition Management Using Expert Systems," Neural Network Expert Systems Presentation (2001).

Umetrics product datasheet, "SIMCA-P 11" and "SIMCA-P+ 11," www.umetrics.com.

W3C, "XSLTransformations (XSLT)," *W3C Recommendation*, pp. 3 (1999).

International Search Report for International Application No. PCT/US2005/015537, mailed Aug. 28, 2005.

Exaimination Report under Section 18(3) for Application No. GB0620323.6, dated May 12, 2009.

English-language translation of Office Action for Chinese Application No. 200580014274.5, dated Aug. 1, 2008.

Office Action for related Japanese Application No. 2007-511568, mailed Dec. 14, 2010.

"Powerful Solutions for Digital Plants", Mimic Simulation v2.6, Mynah Technologies 2003, pp. 1-15.

Alsop et al., "What Dynamic Simulation Brings to a Process Control Engineer: Applied Case Study to a Propylene/Propane Splitter," <URL:http://www.aspentech.com/publication_files/ertc2004_alsop_ferrer.pdf>.

Arzen, "Using Real-Time Expert Systems for Control System Prototyping," *Proceedings of the International Conference on Systems, Man and Cybernetics*, 3:25-30 (1993).

Bailey, "Elsag Bailey automation", approximately 1993.

Bailey, "Introducing Bailey Evolution 90TM . . . The Sound Investment Strategy for Process Automation", 1993.

Bailey, "Wide-Range, Fully Compatible Family of Process Automation and Management Systems", 1993.

Chen, "Real-Time Management in the Distributed Environment," Ph.D. Thesis (1999).

Fisher-Rosemount Systems, Inc., DeltaV Bulk Edit, pp. 1-12 (2002).

Fisher-Rosemount, "Managing the Process Better", Dec. 1993.

Fisher-Rosemount, "Managing the Process Better", Sep. 1993.

FOLDOC, "Declarative Language," Retrieved from the Internet on Jul. 30, 2007: URLhttp://ftp.sunet.se/foldoc/foldoc.cgi?declarative+lanquage.

Honeywell "UDC 6000 Process Controller", Aug. 1992.

Honeywell, "Process Manager Specification and Technical Data", Sep. 1991.

Honeywell, "TDC 3000 Overview", approximately 1992.

Honeywell, "TDC 3000 Process Manager", approximately 1992.

Invensys Process Systems News, Invensys Introduces Enhanced Foxboro Engineering and Operations for the I/A Series Automation System, (2002): Retrieved from the Internet on May 28, 2010: URL:http://www.automation.com/smc/print.php?stripImages=no.

Kopp, About.com, C++ Tutorial—Lesson 17: Classes, Members and Methods, Retrieved from the Internet on Apr. 27, 2005: URL:http://www.cplus.about.com/od/beginnerctutorial/l/aa070602a.htm.

Kopp, About.com, C++ Tutorial—Lesson 17: Classes, Members and Methods, Defining Classes, Retrieved from the Internet on Apr. 27, 2005: URL:http://www.cplus.about.com/od/beginnerctutorial/l/aa070602b.htm.

Kopp, About.com, C++ Tutorial—Lesson 17: Classes, Members and Methods, Defining Methods, Retrieved from the Internet on Apr. 27, 2005: URL:http://www.cplus.about.com/od/beginnerctutorial/I/aa070602c.htm.

Kopp, About.com, C++ Tutorial—Lesson 29: Inheritance Introduction, Retrieved from the Internet on Apr. 27, 2005: URL:http://www.cplus.about.com/od/beginnerctutorial/l/aa120502a.htm.

Kopp, About.com, C++ Tutorial—Lesson 29: Inheritance, Retrieved from the Internet on Apr. 27, 2005: URL:http://www.cplus.about.com/od/beginnerctutorial/l/aa120502b.htm.

Kopp, About.com, C++ Tutorial—Lesson 29: Inheritance, Continued, Retrieved from the Internet on Apr. 27, 2005: URL:http//www.cplus.about.com/od/beginnerctutorial/l/aa12050c.htm.

Kopp, About.com, C++ Tutorial—Lesson 9: Introduction to Classes, Defining Classes, Retrieved from the Internet on Apr. 27, 2005:URL:http://www.cplus.about.com/od/beginnerctutorial/l/aa041002b.htm.

Kopp, About.com, C++ Tutorial—Lesson 9: Introduction to Classes, Object Terminology, Retrieved from the Internet on Apr. 27, 2005: URL:http://www.cplus.about.com/od/beginnerctutorial/l/aa041002e.htm.

Kopp, About.com, C++ Tutorial—Lesson 9: Introduction to Classes, Using Objects, Retrieved from the Internet on Apr. 27, 2005: URL:http://www.cplus.about.com/od/beginnerctutorial/l/aa041002d.htm.

Kurpis, "The New IEEE Standard Dictionary of Electrical and Electronics Terms (Including Abstracts of All Current IEEE Standards)," Fifth Ed., Christopher J. Booth, Editor, pp. 317 (1993).

Leeds et al., "Make Your Automation Plan a Reality: MAX 1000", approximately 1990.

MSDN Magazine, "A First Look at Writing and Deploying Apps in the Next Generation of Windows," Retrieved from the Internet on Aug. 21, 2007: URL <http://msdn.microsoft.com/msdnmag/issues/04/01/DevelopingAppsforLonghorn/?print=true>.

MSDN Magazine, "Create Real Apps Using New Code and Markup Model," Retrieved from the Internet on Aug. 21, 2007: URL <http://msdn.microsoft.com/msdnmag/issues/04/01/avalon/?print=true>.

Nahavandi et al., "A Virtual Manufacturing Environment with an Element of Reality," *Advanced Factory Automation, Conf.* Pub. 398: 624-629 (1994).

Nishimura, "Ways of Considering and Promoting Informational Instrumentation Opened Up by the Web, Web Utilization Viewed in SCADA/HMI Software, Actuality of Plant Data Monitoring by Internet Compatible Add-On-Software," Instrumentation, 45(9):54-59 (1999).

Ohmura, "Dynamic Simulator Visual Modeler," pp. 20-27 (1998).

OPC Foundation, "What is OPC?" Retrieved from the Internet on Aug. 21, 2007: URL http://www.opcfoundation.org/Default.aspx/01_about/01_whatis.asp?MID=AboutOPC.

Podesta et al., "Virtual Instrumentation for the Management, Simulation and Control of an In House Power Plant," IEEE Instrumentation and Measurement Technology Conference, pp. 1104-1106 (1996).

PSS 21S-2B8 B4, FoxView Software, pp. 1-12 (2005).

Reliance Electric Company, "Multitasking Capability Simplifies Process Control Design", approximately late 1980s, by Angelo J. Notte.

Sugitani, "Package Software and Applications for Constructing Job Sites and Control Systems 3, SCADA Software 'FactoryLink 7'", Automation, 45(10):18-23 (2000).

Sztipanovits et al. "Modeling, Model, Interpretation and Intelligent Control" Proc. of the Third IEEE International Symposium on Intelligent Control, pp. 46-50 (1989).

Toshiba, "Toshiba Integrated Control Systems", Nov. 1990.

Wikipedia, "Application Programming Interface," Retrieved from the Internet on Aug. 21, 2007: URL http://en.wikipedia.org/wiki/Application_programming_interface.

Wikipedia, "Extensible Application Markup Language," Retrieved from the Internet on Jul. 30, 2007: URL <http://en.wikipedia.org/wiki/Extensible_Application_Markup_Language>.

Wikipedia, "Vector Graphics," Retrieved from the Internet on Aug. 21, 2007: URL <http://en.wikipedia.org/wiki/Vector_graphics>.

Yang, "Design Issues and Implementation of Internet-Based Process Control System," *Control Engineering Practice*, pp. 709-720 (2001).

Notice of Rejection for Japanese Application No. 2007-511519, dated Jan. 11, 2011.

* cited by examiner

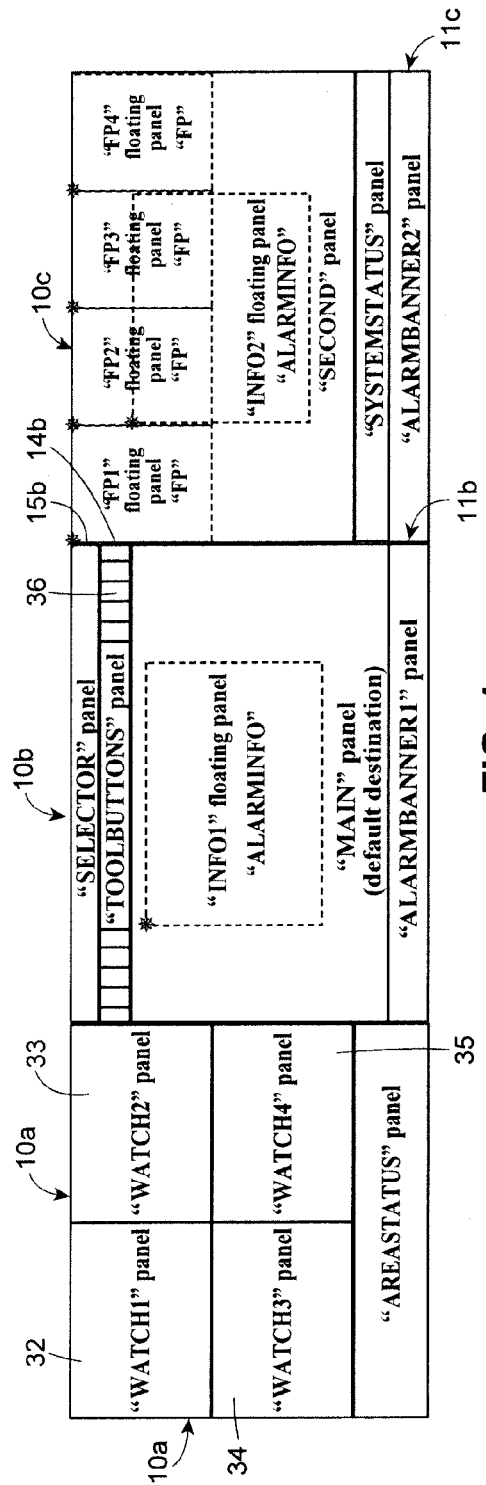
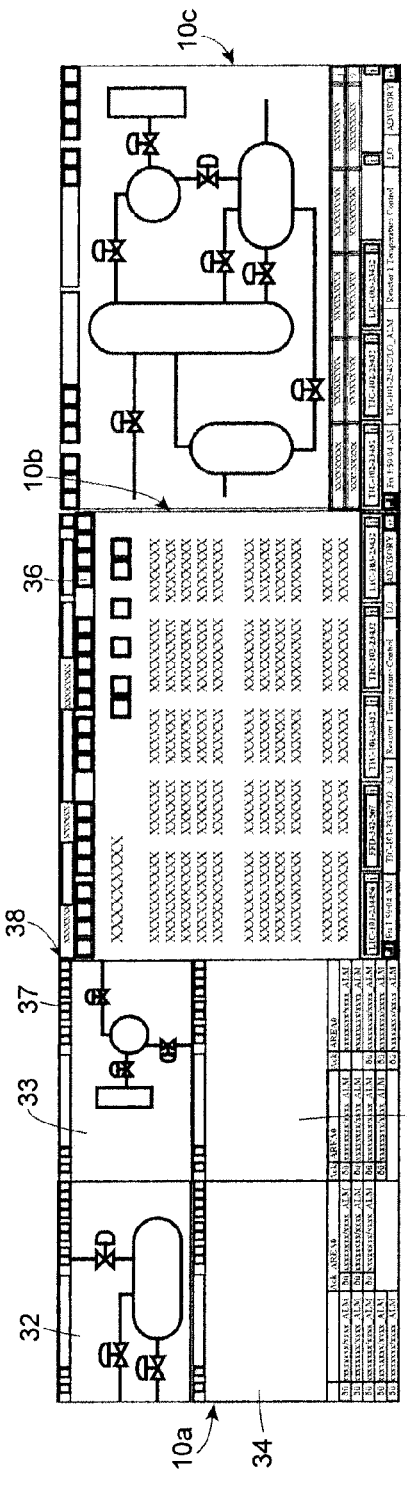
FIG. 4
FIG. 5

USER CONFIGURABLE ALARMS AND ALARM TRENDING FOR PROCESS CONTROL SYSTEM

RELATED APPLICATIONS

This application is a regular filed application of and claims, for the purposes of priority, the benefit of U.S. Provisional Application Ser. No. 60/567,980, entitled "Graphical User Interface for Representing, Monitoring, and Interacting with Process Control Systems," which was filed on May 4, 2004 and which this application hereby expressly incorporates by reference herein in its entirety. This application is also related to U.S. patent application Ser. No. 10/625,481, entitled "Integration of Graphic Display Elements, Process Modules and Control Modules in Process Plants," which was filed on Jul. 21, 2003, and which published as U.S. Publication No. 2004/0153804 on Aug. 5, 2004, which, in turn, is a Continuation-in-Part of U.S. patent application Ser. No. 10/278,469, entitled "Smart Process Modules and Objects in Process Plants," which was filed on Oct. 22, 2002, and which published as U.S. Publication No. 2004/0075689 on Apr. 22, 2004, the entire disclosures of which are hereby expressly incorporated by reference herein in their entirety. This application is also related to U.S. patent application Ser. No. 10/368,151 entitled "Module Class Objects in a Process Plant Configuration System," which was filed on Feb. 18, 2003, and which published as U.S. Publication No. 2004/0199925 on Oct. 7, 2004, the entire disclosure of which is hereby expressly incorporated by reference herein in its entirety. This application is also related to the following patent applications, which are being filed as International (PCT) applications on the same date as this application and which this application hereby expressly incorporates by reference herein in their entirety: "Associated Graphic Displays in a Process Environment" 10/589,712; "Integration of Process Modules and Expert Systems in Process Plants" 10/590,573; "A Process Plant User Interface System Having Customized Process Graphic Display Layers in an Integrated Environment"10/574,824; "Scripted Graphics in a Process Environment" 10/589,845; "Graphics Integration into a Process Configuration and Control Environment" 10/591,804; "Graphic Element with Multiple Visualizations in a Process Environment" 10/590,574; "System for Configuring Graphic Display Elements and Process Modules in Process Plants" 10/575,022; "Graphic Display Configuration Framework for Unified Process Control System Interface" 10/575,173; "Markup Language-Based, Dynamic Process Graphics in a Process Plant User Interface" 10/590,550; "Methods and Apparatus for Modifying Process Control Data" PCT/US05/15596 and 11/556,612; "Methods and Apparatus for Accessing Process Control Data" PCT/US05/15585and 11/556,445 "Integrated Graphical Runtime Interface for Process Control Systems" PCT/US05/15439 and 11/556,347; "Service-Oriented Architecture for Process Control Systems" PCT/US05/15394and 11/556,554.

TECHNICAL FIELD

A user interface for a process control system is disclosed. More specifically, a user interface for a process control system is disclosed that enables the operator to modify, configure and manipulate alarm notifications to show alarm priority, alarm age, details about a specific alarm including alarm profiles, as well as perform alarm trending and superimposing alarm profiles over graphic displays using workstation monitors as well as handheld wireless devices.

BACKGROUND OF THE RELATED ART

Process control systems are widely used in factories and/or plants in which products are manufactured or processes are controlled (e.g., chemical manufacturing, power plant control, etc.) Process control systems are also used in the harvesting of natural resources such as, for example, oil and gas drilling and handling processes, etc. Virtually any manufacturing process, resource harvesting process, including agriculture, can be automated through the application of one or more process control systems.

The manner in which process control systems are implemented has evolved over the years. Older generations of process control systems were typically implemented using dedicated, centralized hardware. However, modem process control systems are typically implemented using a highly distributed network of workstations, intelligent controllers, smart field devices, and the like, some or all of which may perform a portion of an overall process control strategy or scheme. In particular, most modern process control systems include smart field devices and other process control components that are communicatively coupled to each other and/or to one or more controllers via one or more digital data busses. Of course, many of these modern process control systems may also include non-smart field devices such as, for example, 4-20 milliamp (MA) devices, 0-10 volts direct current (VDC) devices, etc., which are typically directly coupled to controllers as opposed to a shared digital data bus or the like.

In any event, field devices include, for example, input devices (e.g., devices such as sensors that provide status signals that are indicative of process control parameters such as, for example, temperature, pressure, flow rate, etc.), as well as control operators or actuators that perform actions in response to commands received from controllers and/or other field devices. For example, a controller may send signals to a valve to increase pressure or flow, to a heater or chiller to change a temperature, to a mixer to agitate ingredients in a process control system, etc.

Obviously, in a complicated process system, a large number of different field devices are transmitting data which eventually is presented at an operator's workstation. Further, all of the field devices either directly present "alarms" to an operator's workstation or the signals transmitted by the field devices are interpreted by software which results in an alarm being sent to an operator's workstation. An operator may receive a large number of alarms during a typical shift. Because most process systems are configured so that alarms are sent in advance of the need for a corrective action as opposed to after a serious problem has been created. Therefore, because an operator may receive a large number of "preemptive" alarms during a shift, operators are often in need of ways to prioritize the alarms received at their workstations. Thus, there is a need for graphical interface software that enables operators to prioritize alarms and make choices in responding to alarms when the number of alarms being received at the operator's workstation is excessive and there are too many to be handled at once.

Another problem associated with currently available user interfaces for process control systems is the lack of contextual information about a specific alarm when the alarm is presented at the user interface or monitor. Specifically, typical systems include an alarm banner disposed at the bottom of the screen whereby all of the information about the physical plant component and the alarm, including the date and time are presented on a single line. As a result, limited information is provided to the operator at a first glance. The operator must then manipulate the screen to receive additional information and make a judgment as to what appropriate action is needed and at what time (i.e., now or later). It would be helpful to provide an operator with improved information about a specific alarm that includes which other active alarms are present in the same control module, equipment module or operator unit. In short, there is a need for improved alarm contextual information which provides operators with additional information regarding other active alarms thereby enabling operators to better understand individual alarms in context of other active alarms.

Another problem associated with alarm signals of process control systems is, simply put, organization. Specifically, due to the large number of field devices sending alarm signals, an operator can be overwhelmed with the sheer number of alarm signals. This situation is commonly referred to as a "alarm flood." The cause of an alarm flood may be a chain reaction of problems occurring within a system. To better evaluate and take corrective action when an alarm flood is occurring, there is a need for improved organization of multiple alarms wherein the alarms are organized hierarchically with age profiles so that an operator can more easily determine the cause of the alarm flood in the "leading edge" of the alarm flood.

Another problem confronted with operators of complex systems involves the number of alarms received and the ability to anticipate problems before they occur. Specifically, there is a need for operators to provide themselves with "display alerts" that would provide operators with specific information used to augment the alarm systems currently available. Specifically, such display alerts could be shift or session specific and could provide tactical alert information enabling an operator to anticipate problems. Such tactical display alerts could also provide one-time operational targets or help the operator ensure that the expected control system response is being achieved.

SUMMARY OF THE DISCLOSURE

In satisfaction of the aforenoted needs, a color display encoding method and software is disclosed that combines an indication of alarm priority and alarm age and allows the operator to manipulate the display of other details regarding an alarm.

In an embodiment, a disclosed alarm "detail display" combines information about a selected alarm, with information about other alarms active in the same control module, as well as parent control objects (equipment modules, units, etc.) and plant areas, including a means to navigate displays providing more information about those control objects.

In an embodiment, alarm monitoring displays are disclosed that are suitable for wireless and/or handheld devices (e.g., a "Pocket PC" or a "PDA").

In an embodiment, dynamically configurable "display alerts" are disclosed that supplement the "permanent" alarms in the process control system to monitor "one-time" conditions or operations progress. Such display alerts include, but are not limited to: "target" alerts for control parameters to assist in maintaining a constant target value (+/− an acceptable error) for a specified period of time; "range" alerts to ensure a control parameter stays within specified limits; "ramp" alerts to ensure a control parameter changes in a linear way to a new target value and within the expected time period;

and summary displays for "display alerts" for defining and identifying which alerts are running, and the current status of said alerts.

In an embodiment, hierarchical "alarm profile" displays are disclosed which are intended to point out where and when the heaviest alarm activity is taking place. Such alarm profile displays can provide a warning or indication of when operators face "alarm floods." In a refinement, the alarm profile displays can indicate active alarm counts vs. alarm age. In another refinement, the alarm profiles can include a selectable time span for: (a) all or selected alarms, (b) all or selected plant areas, (c) all or selected equipment units, and/or equipment modules. In another refinement, the alarm profile displays can include alarm summaries by alarm age, thereby making it easy to identify the still active alarms that occurred on the "leading edge" of the "alarm flood"

In an embodiment, various means for automatically superimposing alarm profiles in the form of a temporary display layer on process graphic displays are disclosed which includes means for finding graphical elements associated with control units, equipment modules, etc. so that alarm profiles can be seen in the spatial context of plant equipment schematics and in process graphical display formats that are familiar to operators.

BRIEF DESCRIPTION OF THE DRAWINGS

The disclosed embodiments and methods are described more or less diagrammatically in the following drawings, wherein:

FIG. 4 is an illustration of a disclosed three monitor workstation environment with various floating displays designed in accordance with this disclosure;

FIG. 5 is another view of a three monitor workstation environment illustrating various examples of watch panels on the left and right and specific alarm information in the central panel;

FIG. 13 is a graphic display of a "ramp" alert to check for a steady ramped or increased volume measurement within a holding tank over a period of 12 hours so that the level within the tank rises to 360 inches;

FIG. 14 is another graphic display summarizing the target, range and ramp alerts described above in FIGS. 11-13;

It should be understood that the figures are not to scale and that various graphical displays are illustrated in partial, diagrammatic and fragmentary views. In some figures, details may have been omitted which are not necessary for an understanding of this disclosure or which render other details difficult to perceived. It should be understood, of course, that this disclosure is not limited to the particular embodiments or graphical displays illustrated herein.

DETAILED DESCRIPTION OF THE PRESENTLY PREFERRED EMBODIMENTS

Figure 1:
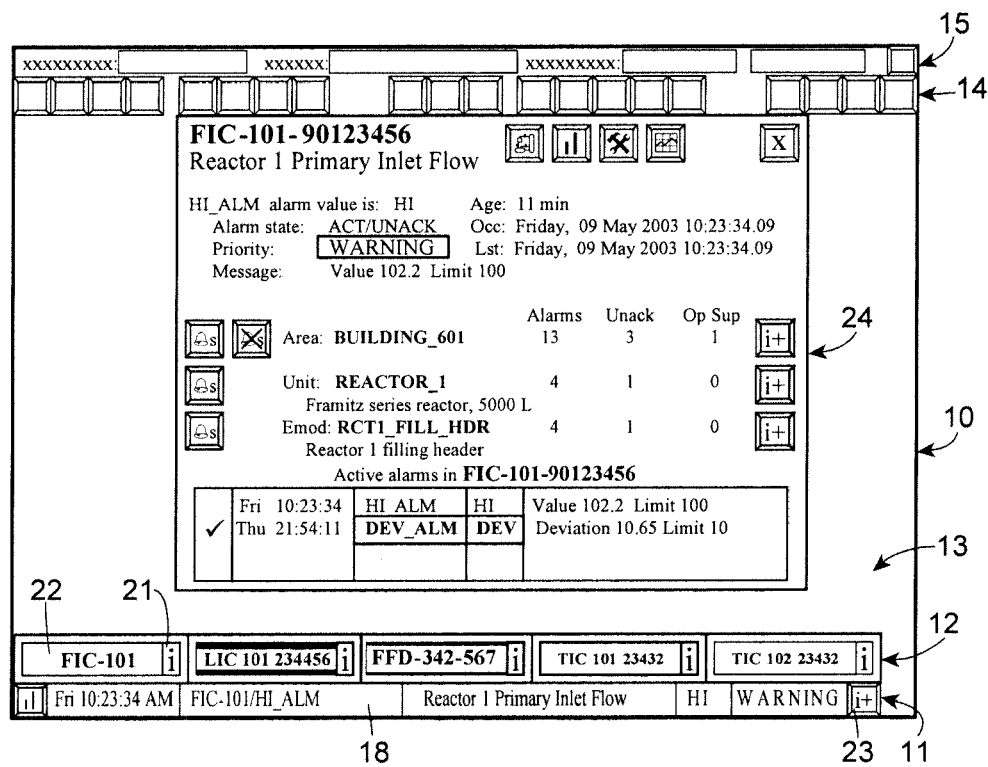
FIG. 1 is a disclosed display for a single monitor workstation environment showing an alarm banner with an expanded alarm display for a primary inlet control valve that is obtained by clicking the "i" button next to the FIC-101 banner in the lower left-hand corner of the display of FIG. 1.
Figure 2:
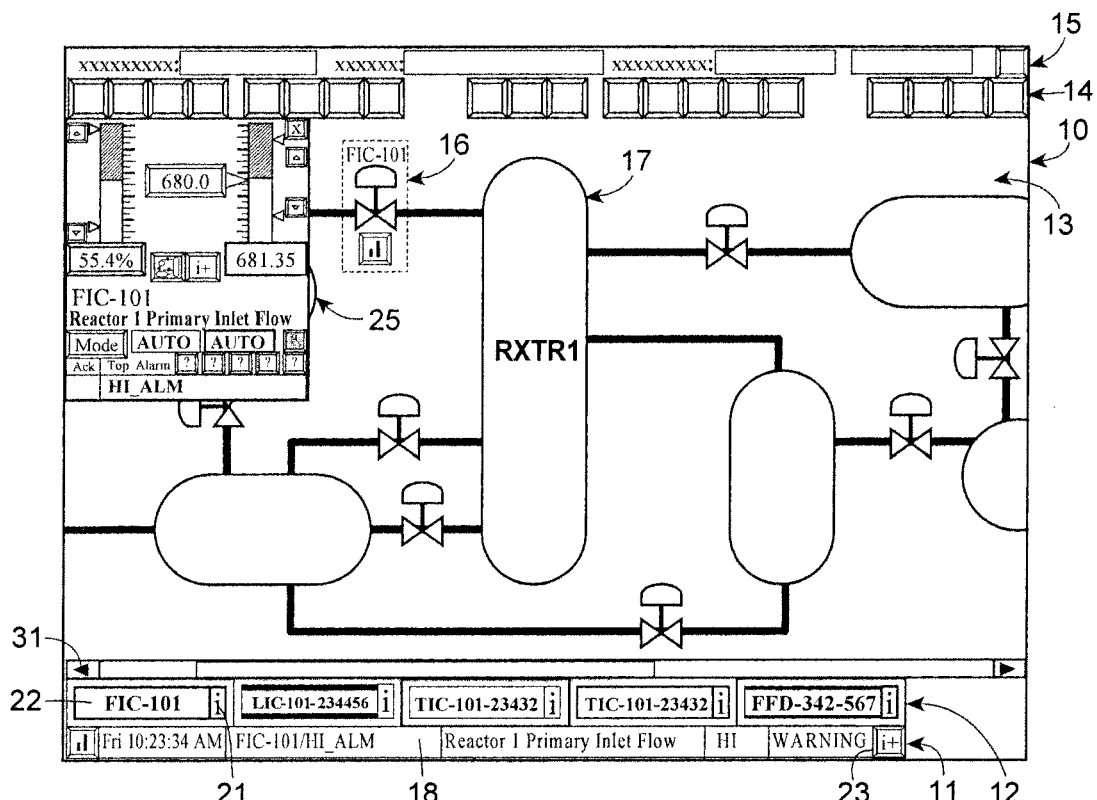
FIG. 2 is a primary control display for the valve FIC-101 that is obtained by pressing the FIC-101 button disposed in the lower left-hand cornier of the display illustrated in FIG. 1 or 2.

Turning to FIGS. 1 and 2, a single monitor workstation graphic display is illustrated wherein the screen 10 includes an alarm panel 11, a system status panel 12, a main display area 13, a tool-panel 14 and a selector panel 15. In the screen 10 shown in FIG. 1, the alarm panel 11 indicates a moderate priority alarm for the control valve identified as FIC-101 and with an object shown at 16 in FIG. 2 which is a primary inlet to the reactor 17, also shown in FIG. 2. The alarm is indicated at 18 in FIG. 1. In an embodiment, the color of background of the alarm panel 11 may indicate when the alarm was activated. For example, a white or clear background could be used for very recent alarms while colored backgrounds could be used for alarms that have been active for an excess of one hour and a dark or black background could be used for alarms that have been active for eight or more hours. The summary shown in the alarm banner 11 for FIC-101 is created by clicking the "i" button 21 next to the indicator 22 in FIGS. 1 and 2. For additional information, the operator can click the "i+" button 23 in FIG. 1 to produce the floating display 24.

The display logic for the button 23 captures the module name "FIC-101" for the alarm currently selected in the alarm banner 11 and constructs a calling informational string of "Display='DvAlarmInfo'; Module='FIC-101'" and then passes it on to the workspace function "OPEN_DISPLAY." The DvAlarmInfo display was configured with a panel category of ALARMINFO. In the framework utilized herein, there is a single floating panel configured to be an ALARMINFO category target so that the floating panel is chosen for the DvAlarmInfo display. If another display is currently open, it is closed to open the display 24 as shown in FIG. 1 when the button 23 is pressed.

The display logic in a "DvAlarmInfo" display such as that shown at 24 in FIG. 1 requires a module name for it's launch information. Finding "FIC-101", it uses that name in calls to the data services layers to obtain information about the valve 16 labeled FIC-101 (see FIG. 2) and it's containing unit and equipment modules. With an understanding of the alarm situation in valve FIC-101, and its related modules, the operator closes the "DvAlarmInfo" floating panel 24, and looks at the primary control display for FIC-101 as shown in FIG. 2, by pressing the button 22 in the alarm banner 11.

Still referring to FIG. 2, by way of example only, the display logic for the alarm banner 11 buttons captures the module name ("FIC-101") and constructs a calling info string of "Panel='MAIN'; Module='FIC-101'; Select="FIC-101"; KeepARScrollOneDim", and then passes the string to workspace function "OPEN_PCD". The OPEN_PCD function resolves the primary control display name "REACTOR1_TOP" for module "FIC-101". It then asks the workspace to resolve PANEL='MAIN', and to replace the display currently in that panel with REACTOR1_TOP. REACTOR1_TOP originated through an import of a P&ID drawing from another system, so it's native aspect ratio is much wider than the MAIN panel 13 in the current framework. A "KeepARScrollOneDim" directive says that the aspect ratio for REACTOR1_TOP should be maintained while scaling it to fill the MAIN panel 13, with scroll bars for portions of the display that wont fit.

The Select="FIC-101" directive is forwarded to "REACTOR1_TOP" telling it to resolve the "best" selectable graphic object associated with "FIC-101" and automatically give it selection focus (scrolling the display as necessary so the selected object is visible and as centered in the MAIN panel as possible.) The presence of the "KeepARScrollOneDim" and "Select" directives overrides the default workspace behavior which remembers the scaling and scroll position last used on a display, for when it is opened again in the same user/session.

After looking at "near by" alarm conditions and process measurements, the operator chooses to make an adjustment to the setpoint on FIC-101, and watch how that control loop reacts. The faceplate display 25 shown in FIG. 2 is the ideal interface for what the operator has in mind, so he pushes the FIC-101 button 22 which is still in the alarm banner 11. The display logic for the faceplate button 22 captures the module name ("FIC-101") associated module, constructs a calling info string of "Module='FIC-101'", then passes it to workspace function "OPEN_FPD".

The OPEN_FPD function resolves the faceplate display name "PID_LOOP_FP" for module "FIC-101". The "PID_LOOP$_{13}$FP" display 25 was configured with a panel category of "FP". In the current framework, there are two floating panels configured to be an "FP" targets, both are currently empty, so floating panel 25 on the left is chosen as it was placed ahead of the other floating panel in the floating panel "use order" configuration. An instance of the PID_LOOP_FP display 25 is opened there, passing it the launch information: "Module='FIC-101'".

The display logic in the "PID_LOOP_FP" display 25 expects a module name to be in it's launch information. Finding "FIC-101", it uses that name in calls to the data services layers identify the parameters in FIC-101 it will be reading. Several parameter/field values from the valve FIC-101 (see 16 in FIG. 2) are used repeatedly in the FIC-101 display 25, most notably the scaling parameter associated with the pressure value "PV" and system pressure "SP" parameters. The "pre-update" logic for "PID_LOOP_FP" read the EU0 and EU100 values, engineering units string and decimal places information and stores them in "local display variables" which can be referenced by any of the graphic elements in "PID_LOOP_FP". In short order, a new instance of "PID_LOOP_FP" appears in the floating panel initially located at its anchor point.

Figure 3:
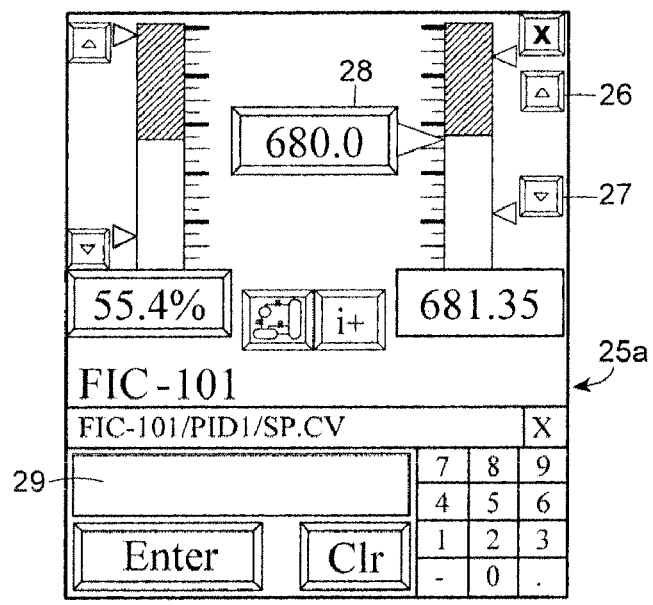
FIG. 3 is an expanded view of the floating panel in the upper left portion of the display of FIG. 2 which is expanded by clicking on the set point value (680) shown in the floating display of FIG. 2 and which enables the operator to enter a new set point value in the space provided.

Turning to FIG. 3, if the operator thinks a significant system pressure change is appropriate and using the nudge up 26 or down 27 buttons won't do, the operator can push on the button 28 indicating the set point value. The display logic for the system pressure button 28 click is to ask the workspace to provide a standard numeric data dialog. The "PID_LOOP_FP" display 25a of FIG. 3 is designed to also be used in workspaces running on PDAs, so it constructs a parameter info string of "InParentDisplay; DockBottom; Title='FIC-101/PID1/SP.CV'" and passes it to the workspace function "NumericDataEntry". The NumericDataEntry workspace function sees that the workspace was launched with a "ShowKBOnScreen" preference (perhaps running on a hardware where the keyboard is not always present), so it chooses an instance of the standard numeric data dialog with an on screen keypad. The workspace resolves the dimensions and location of this instance of the PID_LOOP_FP display, and locates the dialog box at the bottom of the faceplace display.

The operator can enter a new value for the setpoint in the box 29. The operator then sees the new value for setpoint reflected in the value shown on the setpoint button 28 and is assured that the controller is now using/reporting the new setpoint value. The mode shown in FIG. 3 is in AUTO so the confirms some changes in the control (valve) output, and shortly thereafter the pressure starts moving in the desired direction.

In FIG. 4, the operator can use a three monitor workspace with screens 10a, 10b, 10c. When a new alarm appears in the alarm banners 11b or 11c, the operator can recognizes the "tag" appearing in the banner and can confirms the module description. To correct a problem upstream of FIC-101 see FIG. 2), the operator can push the left faceplate button 31 in FIG. 2 to view upstream components. With a three monitor display of FIGS. 4 and 5, the operator can put a copy of the upstream display in one of the empty panes 32-35 in the left monitor screen 10a. To accomplish this, the operator pushes the "copy panel content" button 36 in the toolbar 14b over the main panel 10b. The display logic behind the copy panel content button 36 prepares a parameter information string of "Panel=MAN" and calls the workspace function CopyPanelContent. The Copy PanelContent function captures the display name currently in the specified panel, the launch information used to create that display, and the current scaling, and scroll position settings.

The operator then pushes a "paste" button, e.g., 37, in the combined information and tool button bar 38 of an empty panel, for example the panel 33, of the left monitor or screen 10a. The paste button 37 essentially prepares a parameter information string of "Panel='<my panel id>'; UseSourceScale", and calls the workspace function that "paste copied panel contents" to "this" panel (in this case 33). The new instance of the display, with the original launch information is opened in the panel 33. The scaling of the source display is preserved, but since the panel is half the size of the source panel, the view is centered on the center point of the source view, and horizontal and vertical scroll bars appear.

Figure 6:
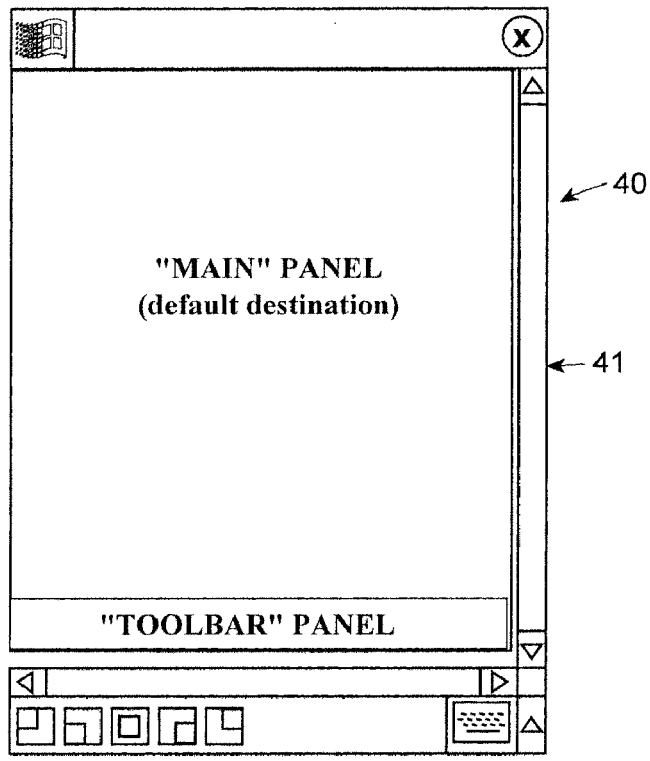
FIG. 6 is an illustration of a display for a hand-held PC, pocket PC or personal digital assistant ("PDA") device.
Figure 7:
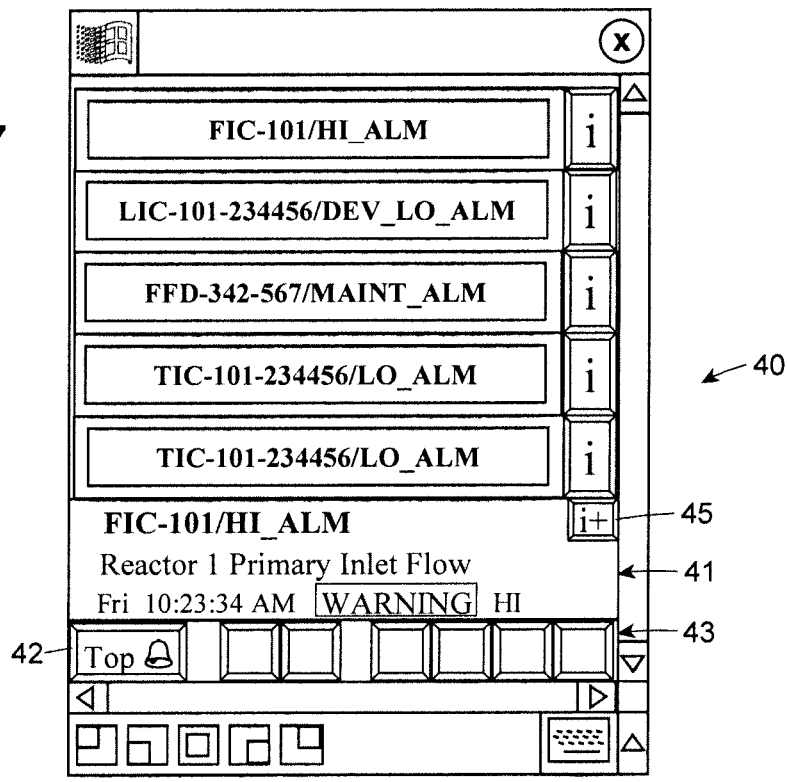
FIG. 7 is an illustration of a display for a PDA device with various alarms indicated thereon.

Turning to FIG. 6, an operator or operations supervisor monitor the system using a PDA 40. As shown in FIG. 7, the operator can keep the "TOP_ALARMS" display open in the main panel 41. The TOP_ALARMS display can be closed by pressing the "Top" button 42 in the toolbar panel 43 as shown in FIG. 7.

Figure 8:
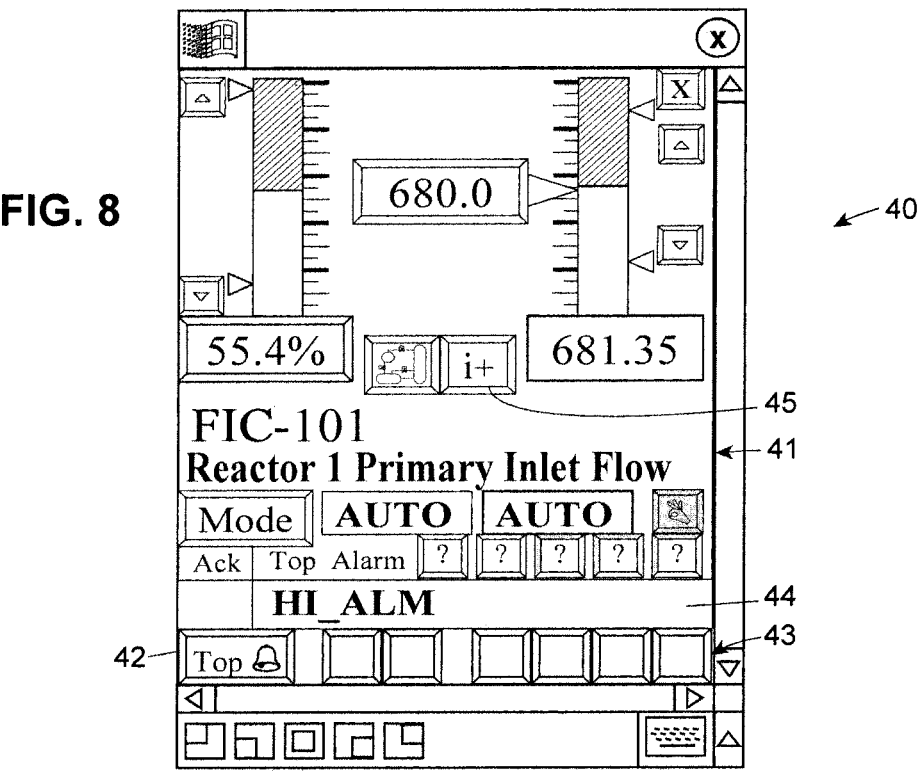
FIG. 8 is another illustration of a graphic display for a PDA device displaying specific alarm information for the inlet flow control valve illustrated in FIGS. 2 and 3.

In FIG. 8, the PDA 40 produces an alarm banner 44 and, optionally, a warning-level alarm sound. The operator can push the "i+" button 45 to check for other alarms in this module, equipment module, and unit. The display logic for the "i+" button 45 of a PDA 40 is designed to call up the ALARMINFO display for the selected module. Normally the ALARMINFO display would be retrieved from the DEFAULT subtree under the display configuration storage root directory. However, this workspace was started with the launch information "DisplayPref=PDA", so it will attempt to find a display definition named ALARMINFO in subtree named PDA, before looking for it in the DEFAULT subtree.

Figure 9:
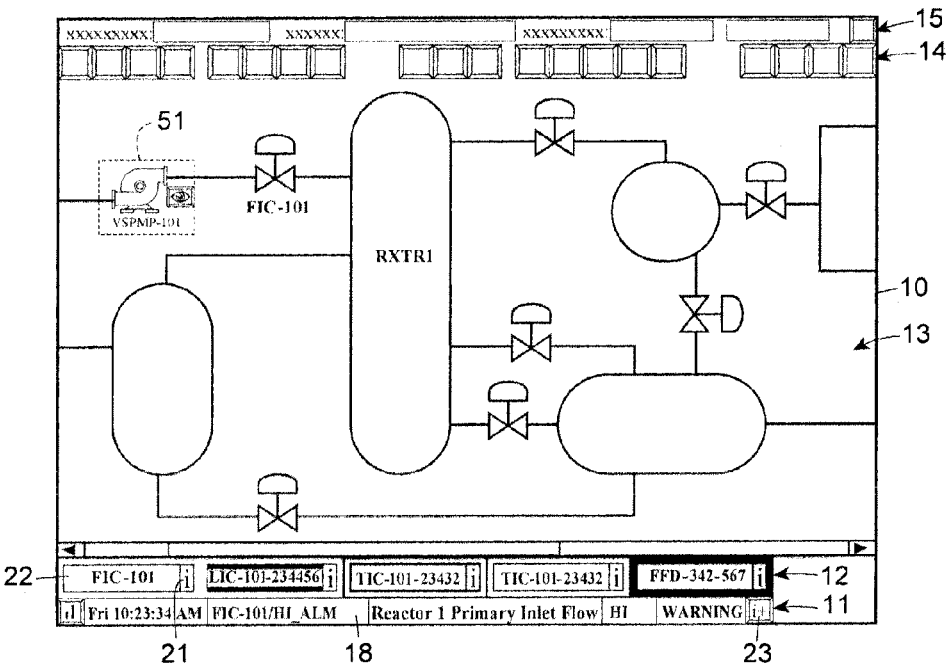
FIG. 9 illustrates a graphics display for a single monitor workstation environment showing an alarm related to the primary inlet flow valve identified as FIC-101 but where the object upstream pump identified as VSPMP-101 has been clicked on to provide further information as the alarm cause is being investigated.

Returning a single workstation as shown in FIG. 9, as one example, the operator has been noticing intermittent deviation alarms on the primary inlet flow control loop for reactor 1 (RXTR 1). Observing the primary control display for reactor 1, an operator could conclude that the deviation alarm occurs when demand peaks for a few minutes as a result of new production rates. To retrieve information on the inlet flow feed pump VSPMP-101, the operator clicks oh the graphic object 51 representing the pump VSPMP-101 to generate the display of FIG. 10. The pump object 51 in the display of FIG. 9 may be taken from a standard library of graphic objects and can be configured to be a selection target, and when selected, to indicate selection with a dashed box around the pump VSPMP-101 as shown in FIG. 9 and the pump's tag string, and also to make the button visible that opens the runtime object browser application. Clicking on the pump VSPMP-101 or object 51 around the pump VSPMP-101 gives feedback that it is selected in the form of FIG. 10, and the object browser button appears.

Figure 10:
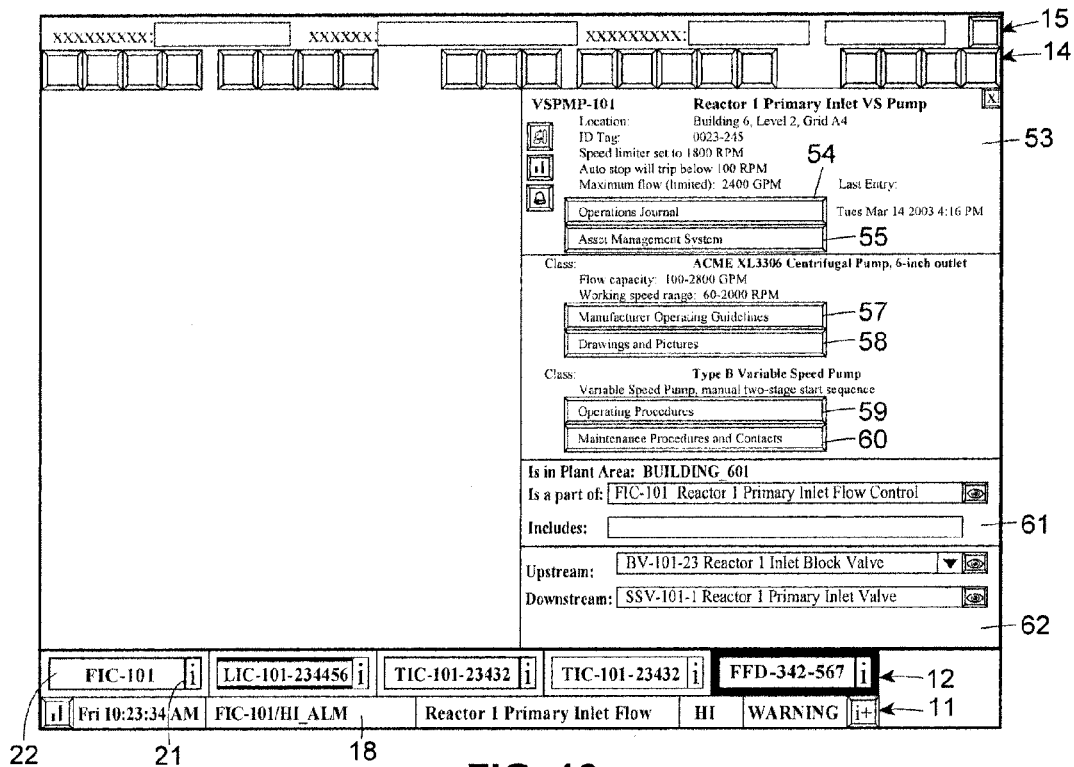
FIG. 10 illustrates the graphic display as a result of the actions taken by the operator in connection with FIG. 9 wherein details relating to the pump VSPMP-101 are provided.

In FIG. 10 the operator can review various information about the pump VSPMP-101. The first section 53 has information about the specific pump including location, ID tag number, and physical specifications. A button 54 is available here to open the "Operations Journal" application for the pump VSPMP-101. Another button 55 is provided to access the Asset Management Solutions (AMS) software data for the device VSPMP-101. The second section 56 contains information about the type and class of pump including buttons 57-60 to access the manufacturer's operating guidelines documentation, drawings, or identification pictures, and training documents such as standard procedures such as operating and maintenance procedures. The third-section 61 provides location information and the fourth section 62 allows the operator change the display 10 to other upstream or downstream objects.

Figure 11:
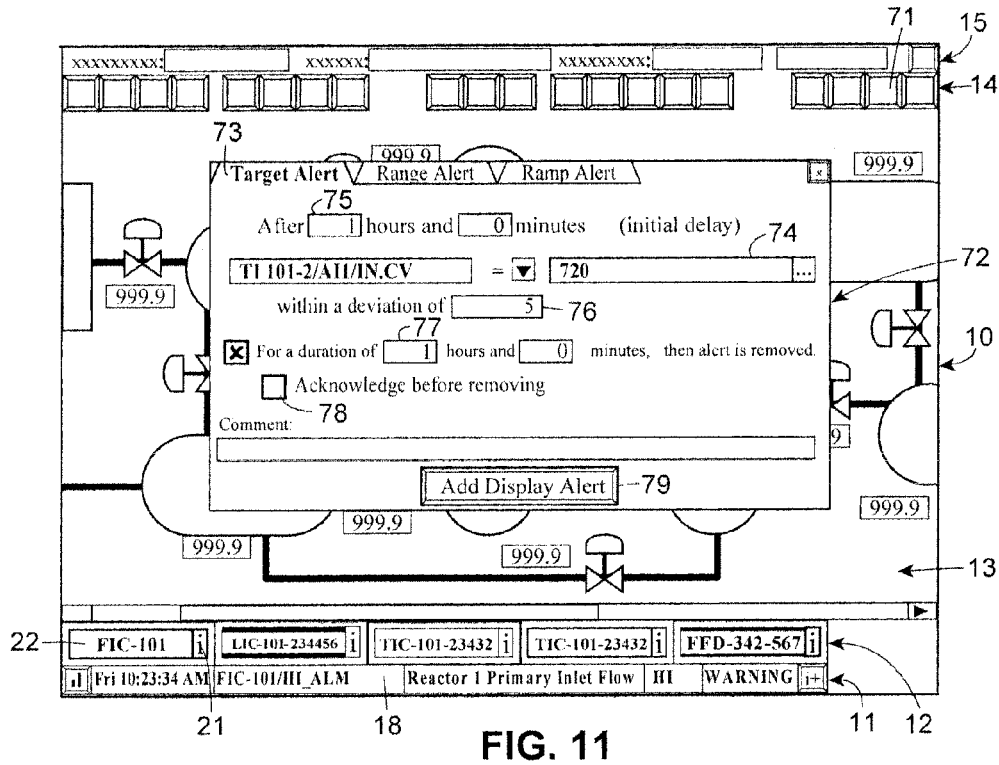
FIG. 11 is an illustration of a graphic display whereby an operator has established a "target" alert of 720° for a reactor tank TI-101 with an acceptable deviation of +/−5° for a duration of one hour.

FIGS. 11-17 illustrate the use of target alert, range alert and ramp alert alarm profiles. For example, if the operator had just finished responding to an alarm by making a setpoint change and was satisfied the change was accepted by the controller, the operator may want to monitor the primary control display for this change but is unable to because of other alarms. The use of a display alert may be helpful in alleviating this problem. Turning to FIG. 11, if a temperature setpoint change is going to take an hour to raise the temperature on the product in reactor 1 (see FIG. 9) to the new target of 720° F., the operator can start a target alert by clicking on an "Add Display Alert" button 71 in the toolbar panel 14 over the main panel 10 showing the control display for reactor 1 causing the display alert dialog box 72 to appear as shown in FIG. 11.

If the operator desires "target alert" he or she selects tab 73. The parameter that needs to be set for the alert on is already inserted into the box 74 due to the process change. The operator sets an initial delay of 1 hour by appropriately filling in the box 75, before checking that the target value of 720° has been reached. A different target value may be entered in the box 74 if necessary and an acceptable deviation band (+/−5 degrees) is entered into the box 76. The alert check duration of 1 hour (making sure the temperature doesn't drop or overshoot for at least an hour after the target is achieved) is entered into the box 77. If the operator doesn't have anything more to do when this alert is removed, the "acknowledge" box may be cleared. The remaining boxes in the display 72 are self explanatory and will not be described in detail here. When finished with the target alert, the operator hits the "add display alert" button 79. The display 72 closes and a runtime workspace adds the new display alert. In an hour, the controller will start checking that the value for TI/101-2/AIN.CV is 720 (+/−5) degrees, and continue for the next hour. After that point, the target alert shown in FIG. 11 will automatically remove itself.

Figure 12:
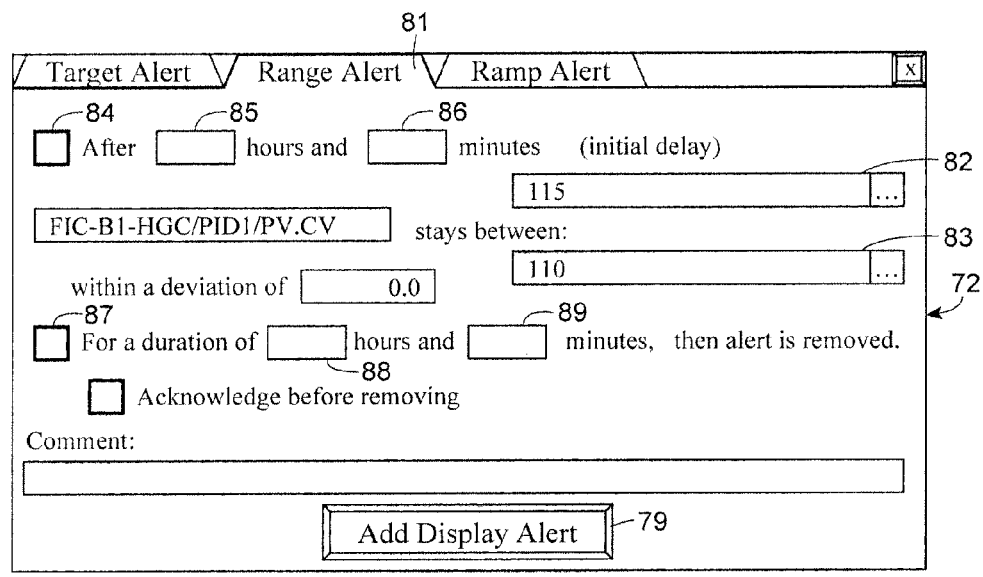
FIG. 12 is a graphic display of a "range" alert whereby the operator knows a particular stream flow should fall within the range of 110 to 115 gpm and has set an alert to go off in the event the flow falls outside of that range.
Figure 15:
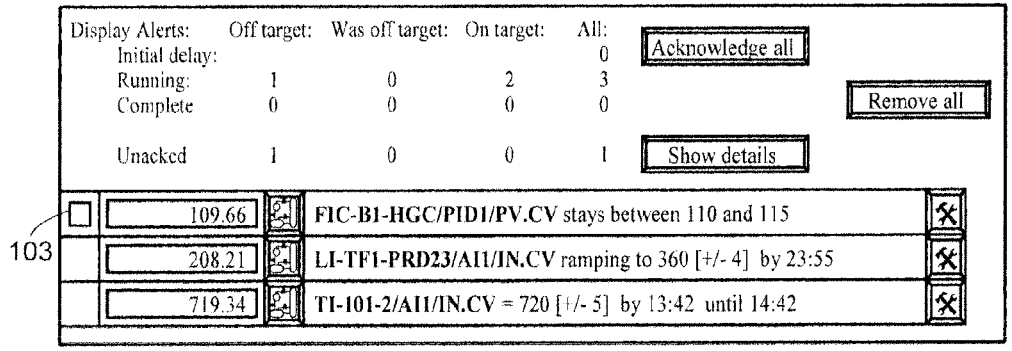
FIG. 15 is an enlarged view of the summary of the target, range and ramp alerts illustrated in FIG. 14.

Turning to FIG. 12, a range alert may be desired to check in change in output or throughput. After clicking on the button 71, the dialog 72 appears, but operator can switch to the range alert tab 81 as shown in FIG. 12. If a flow rate of 112 gpm is desired, the operator can set upper and low range limits in the boxes 82, 83 for the display alert. If a flow rate of 112.2 gpm has already been established so there is no need for an initial delay on the display alert and the boxes 84-86 are left blank. Also, if the product is to be made for an extended period of time exceeding a shift change, the boxes 87-89 can be left blank as well and clicking on the button 79 can institute the range alert.

Figures 13, 14:
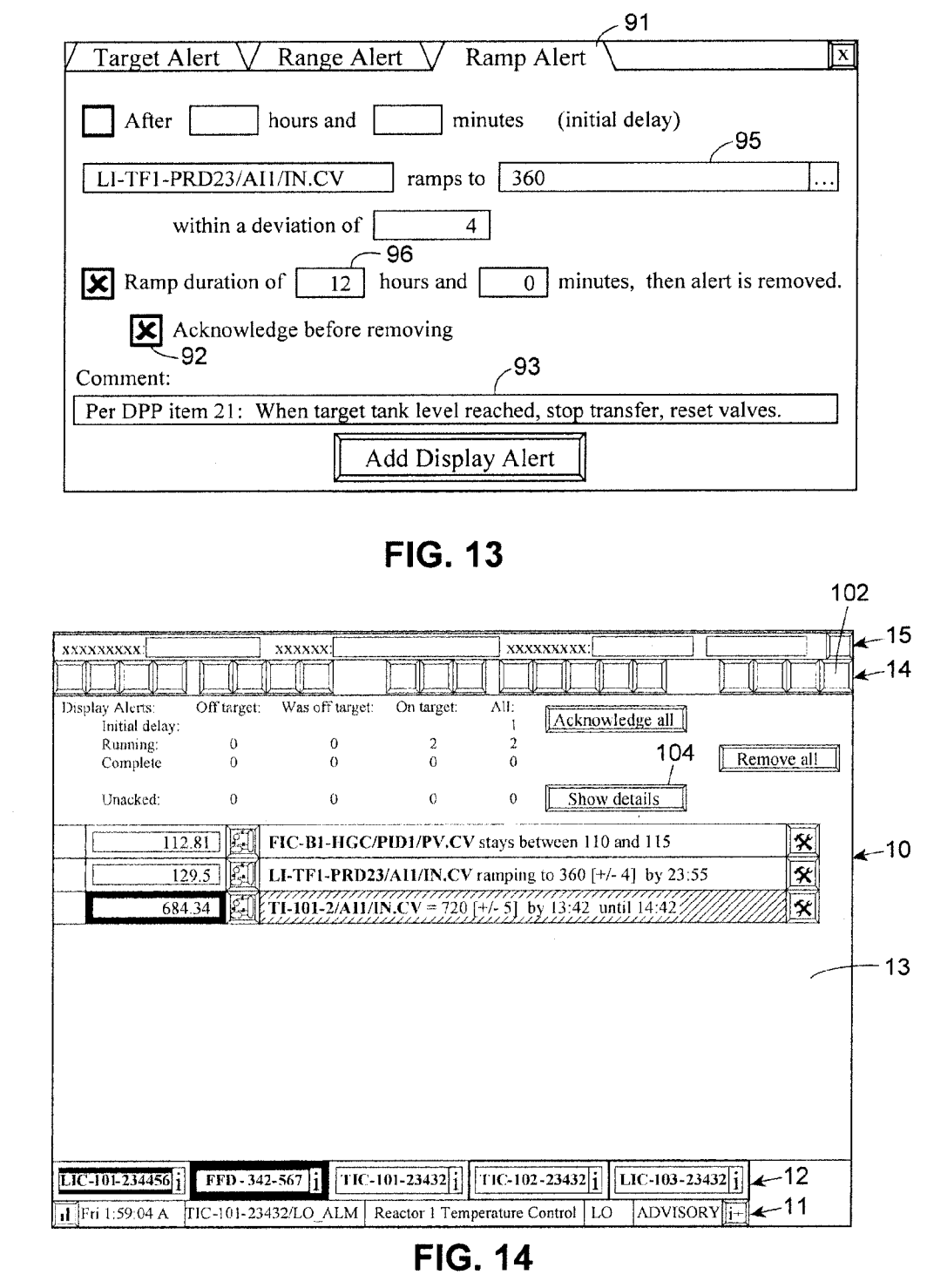

A ramp alert is illustrated in FIG. 13. If a large tank needs to be filled, the operator can pull up the tank farm process display, and uses the object browser application to get the link to the product movement procedure checklist. After manually opening and closing the appropriate block valves, the operator can start the pump and verify a steady flow measurement as the product is transferred to the tank. In FIG. 13, a ramp alert is set for a plan to achieve a level of 360 inches (see box 95) in the destination tank that level will be achieved in 12 hours (see box 96) based upon a target flow rate.

With no discharges planned, operator expects a steady increase of the level of the tank from its present measurement, to the target over the next 12 hours. Rather than set a target alert (with no checking going on for 12 hours), a ramp alert can be chosen instead by clicking on the tab 91 to check for a steady "ramped" measurement throughout the next 12 hours. Since the next shift operator will need to shut off the transfer pump and close valves, the current operator checks the "acknowledge before removing" box 92 so the completed alert will get the next operator's attention. The operator also adds a comment in box 93 to remind the next operator what needs to be done.

To check the display alerts described in FIGS. 11-13, the operator presses a "display alerts status" button 102 in the tool bar 14 (or alarm banner panel 11 or elsewhere). This button 102 replaces the content of the main panel 10 with the display alerts status application shown in FIGS. 14 and 15, where the three display alerts of FIGS. 11-13 are summarized. Comparing FIGS. 14 and 15, the target flow rate of 110-115 gpm of FIG. 12 is not being achieved at the point in time represented in FIG. 15 thereby producing a warning indicator 103 while the target rate was being met in FIG. 14. Also, the target temperature of 720° set in FIG. 11 was not met in FIG. 14 but met in FIG. 15.

Figure 16:
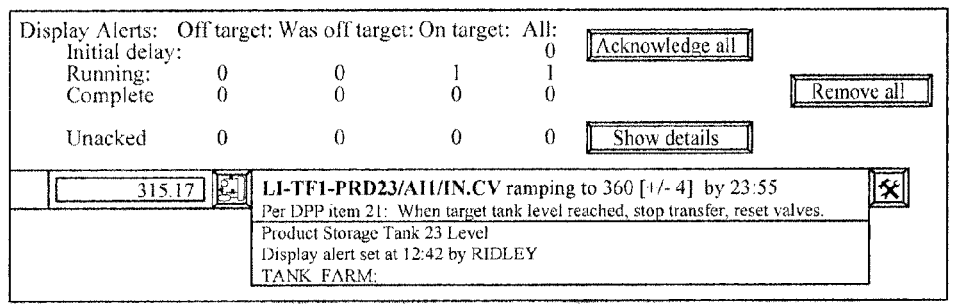
FIG. 16 is an expanded view of a summary of the ramp alert illustrated in FIG. 13 at a subsequent time to that illustrated in FIG. 15.
Figure 17:
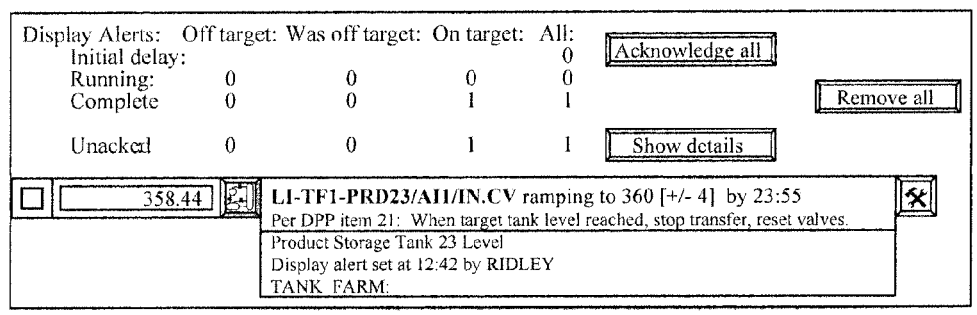
FIG. 17 is an expanded view of the ramp alert illustrated in FIG. 13 at a subsequent time to those illustrated in FIGS. 15 and 16 as the goal of 360 inches is at or near completion.

As shown in FIGS. 14 and 16, during a subsequent shift, the new operator may push the display alerts status button 102 (FIG. 14) to review what the previous shift had left him. FIG. 14, would show a single display alert left over, so the operator presses the show details button 104 to get the information shown in FIG. 16 indicating a level of 315 inches in the tank, still short of the desired 360 inches.

After a couple of hours, the operator would notice a display alert indicator in the alarm banner 11 area had turned white and began flashing. After opening the display alert status display, the display of FIG. 17 would appear to indicate that the ramp alert of FIG. 3 has been completed, and requires acknowledgment. The operator would then acknowledge the completed display alert and press the button for the primary control display for LI-TF1-PRD23 so that the transfer pump can be stopped and the transfer valves reset.

Figure 18:
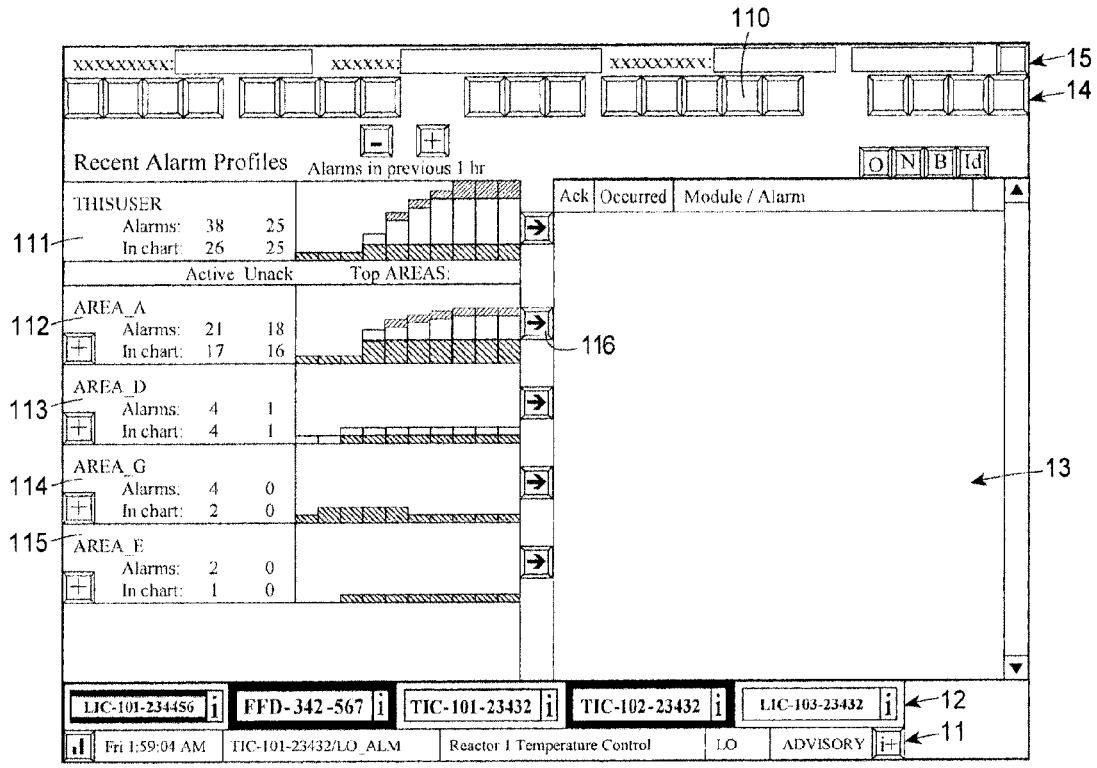
FIG. 18 is a graphic display for an alarm profile summary that indicates active alarm counts, stacked by priority and charted over a previous time period.
Figure 19:
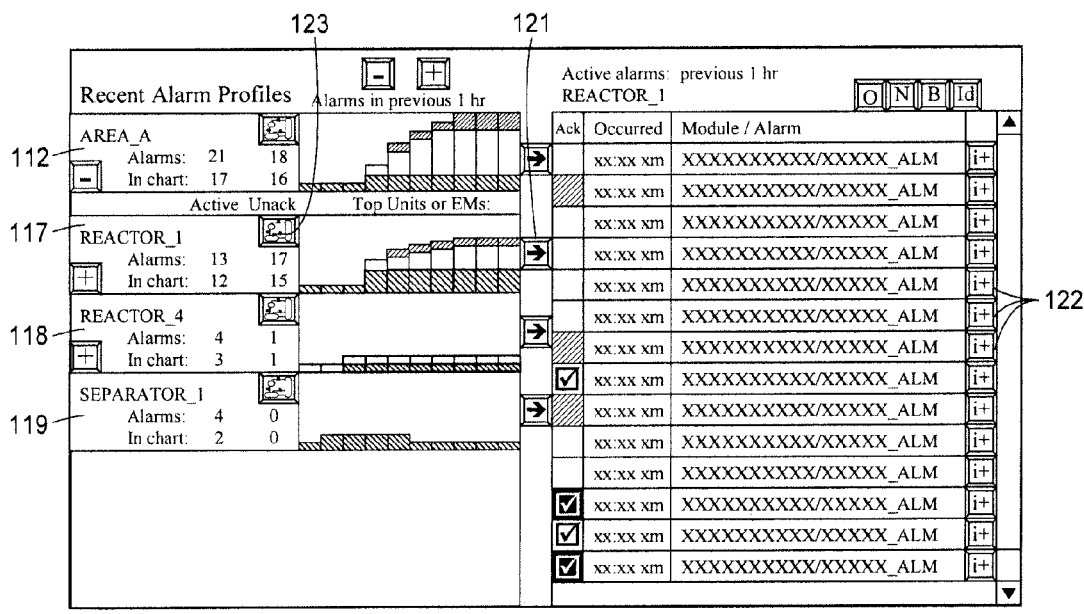
FIG. 19 is an illustration of a graphic display for an alarm profile for a specific area "A" which includes two reactors and a separator as shown.
Figure 20:
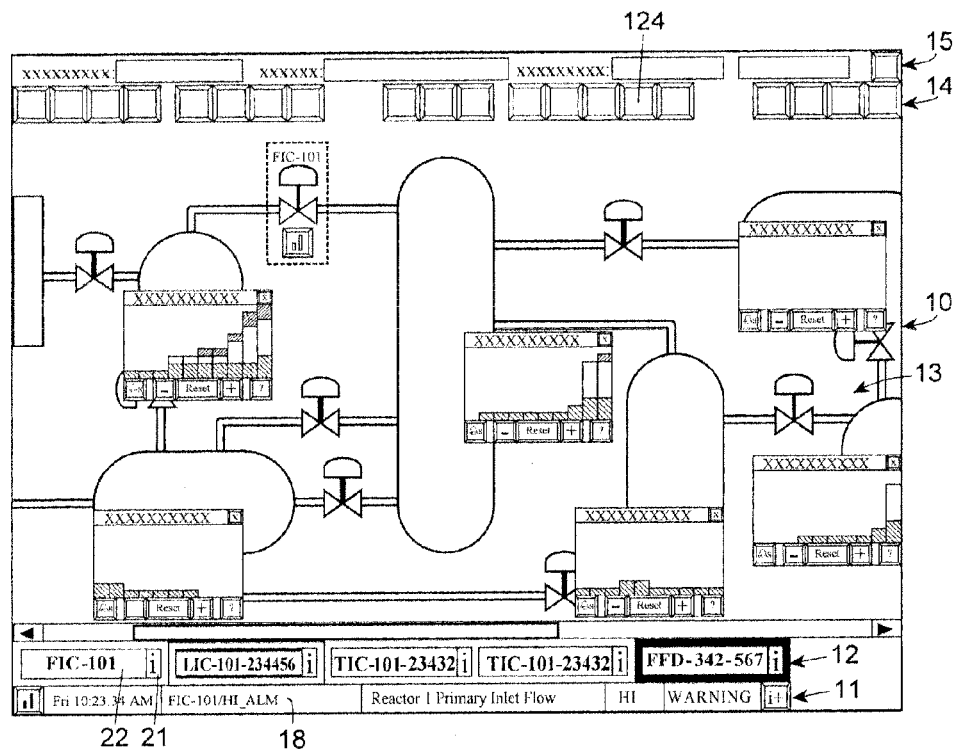
FIG. 20 is a graphic display where an advance display button features has been clicked on and alarm summaries are presented on top of a schematic illustration of the process control area.

FIGS. 18-20 illustrate disclosed techniques for responding to alarm floods. As will be apparent to those skilled in the art, new alarms can be produced faster than the operator can keep up with. The operator can push a button 110 in the toolbar panel 14 for the "alarm profiles" application which would appear in the main panel 13 replacing the previous display as shown in FIG. 18. The alarm profile charts indicate active alarm counts, stacked by priority, and charted over the previous hour. The top chart 111 shows the active alarm profile for all active areas under the operator's control (or alarm management scope), and automatically shows charts for each of the five most active plant areas, four of which are shown at 112-115. From FIG. 18, it is clear that area "A" (chart 112) is problematic, so the operator may press the "expand" button 116 for that area to produce the more detailed charts of FIG. 19.

In FIG. 19, the chart 112 of FIG. 18 becomes the upper chart in FIG. 19, with the charts for the five most active units/equipment modules in the plant area disposed below the chart 112, three of which are shown at 117-119. FIG. 19 shows that nearly all the new alarms are coming from the reactor 1 unit in chart 117. By pushing the "list alarms" button 121 for reactor 1, a list of all active alarms associated with that unit that occurred within profile time window (the previous hour) appears in the right side of the display in FIG. 19. Using the "i+" buttons 122, the DvAlarmInfo display for the alarms can be opened for full details. To get a another view on the alarm profile for reactor 1, the operator can press the "primary control display" button 123 for reactor 1 to produce the display of FIG. 20.

The "advanced display features" button 124 on the toolbar panel 14 enables to operator to select "add alarm profiles." This causes the runtime workspace to find the graphic elements associated with unit and equipment modules, their location on the screen, and creates a temporary display layer for the existing display which shows active alarm profiles for each major equipment grouping. The other layers in the display are subdued or semi-transparent to make the alarm profiles easier to see as shown in FIG. 20.

Figure 21:
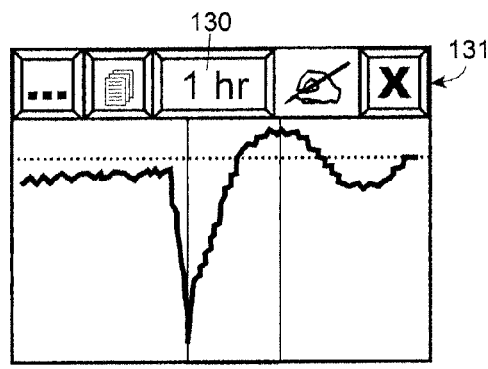
FIG. 21 is an example of a trend display for a control valve that illustrates an abrupt decrease in flow within the past hour.
Figure 22:
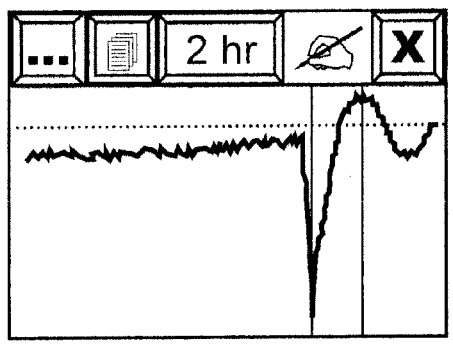
FIG. 22 is another graphic trend display for the same control valve illustrated in FIG. 21, but over a two hour time period as opposed to a one hour time period.
Figures 23, 24:
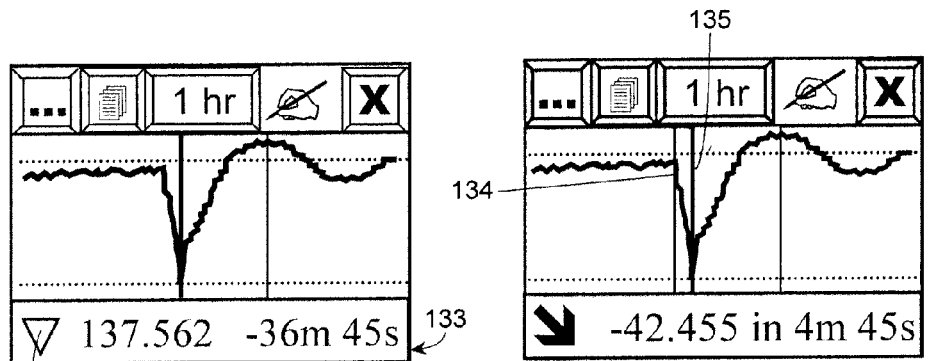
FIG. 23 is a-manipulated display showing the same data of FIG. 21 to identify a minimum flow value and when the minimum flow value occurred.
FIG. 24 illustrates the flow drop over a period of four minutes and 45 seconds for the control valve illustrated in FIGS. 21-23.
Figure 25:
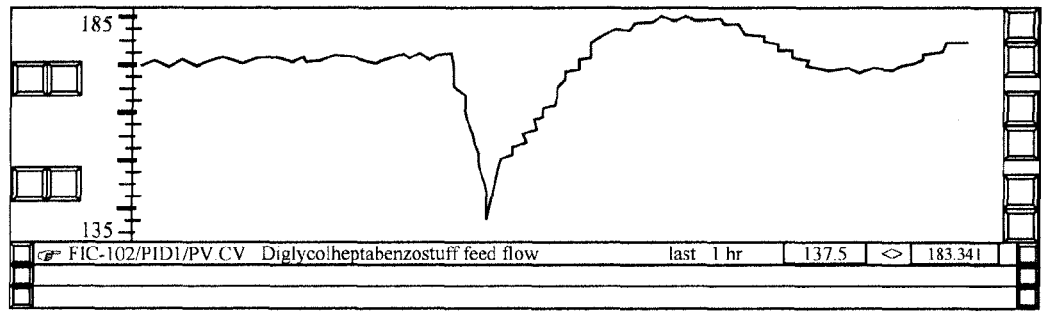
FIG. 25 is another graphical presentation of the drop in flow rate illustrated in FIGS. 21-24.
Figure 26:
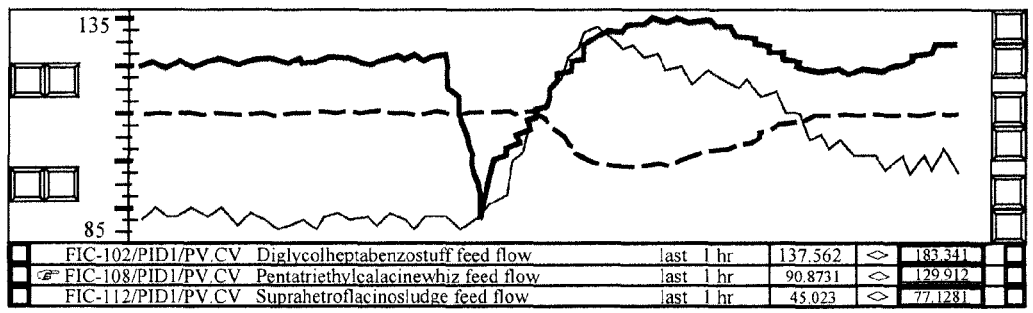
FIG. 26 is a comparison of the drop in flow rate for the valve illustrated in FIGS. 21-25 with the flow rates of two other valves over the same time period.
Figure 27:
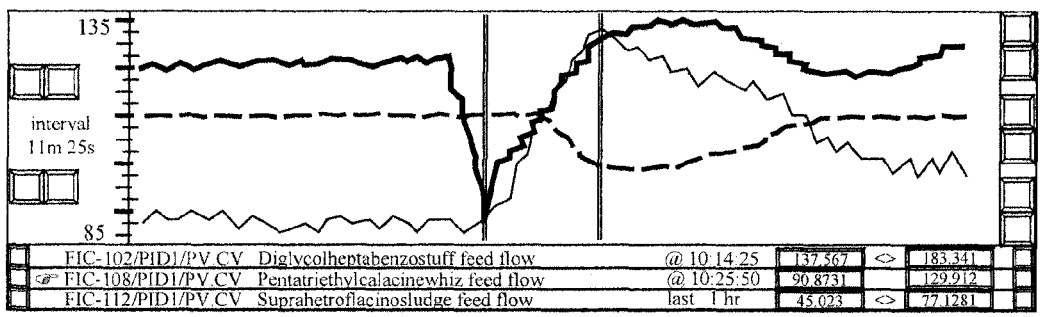
FIG. 27 is a further manipulation of the display shown in FIG. 26 used to analyze the data over a more discreet time period.

FIG. 21 is a trend pop-up for a valve showing a distinct-drop in flow rate about 1 hour ago. To check the value for a longer time period he clicks on the period button 130 in the control-bar 131, and it cycles to a 2 two hour view as shown in FIG. 22. Using the keyboard arrow keys or a mouse to place the cursor back a couple of samples until the "minimum value" icon 132 appears in the legend bar 133, the operator can find and display the low point of the curve as shown in FIG. 23. As shown in FIG. 24, the slope of the downward curve can be calculated by placing another vertical bar 134 in the appropriate place as shown before the low point vertical bar 135. The flow through one valve FIC-102 may be compared and contrasted with the flow through related valves FIC-108 and FIC-112 as shown in FIGS. 25-27.

It will be noted that the placement of various buttons, displays, toolbars, alarm banners, system status banners, etc., are relatively arbitrary and their placement may be modified substantially without departing from the spirit and scope of this disclosure. All of the graphic layouts disclosed in FIGS. 1-27 are exemplary and for purposes of illustration and are clearly not intended to limit the spirit 6 and scope of this disclosure or the appended claims.

As a result of the displays shown in FIGS. 1-27, the operator is provided with a clear graphical interface that combines an indication of alarm priority and alarm age and allows the operator to manipulate the display of other details regarding a specific alarm or alarms. Information regarding a selected alarm may be combined with information from other alarms and equipment data. Further, the graphical displays are applicable to PDA devices for use by supervisors as well as operators. Various types of display alerts and hierarchical alarm profiles are also provided to improve the effectiveness of plant operators.

What is claimed is:

1. A graphical user interface for a process control system that includes a plurality of data inputs and a variety of alarms for said data inputs, the interface comprising:
   a main panel display including a plurality of alarm indicators, wherein each of the alarm indicators includes a visual representation of an active alarm for a data input from one or more of a control module, an equipment module, or a processing unit and provides indicia of alarm priority and alarm age; and
   an alarm profile display providing contextual information corresponding to a selected one of the plurality of alarm indicators wherein the contextual information includes another alarm indicator to which the selected alarm indicator is a parent, the alarm profile display including a plurality of alarm profiles wherein active alarms are grouped by at least one or more of time span, plant area, process unit and equipment module, and
   wherein the alarm profiles are super imposable on a process graphic display so that alarm profiles can be seen in the spatial context of equipment schematics depicted in the process graphic display.

2. The interface of claim 1 wherein the main panel display is simultaneously viewable with the alarm profile display.

3. The interface of claim 1 further comprising a listing of all active alarms along with alarm age profiles for each active alarm.

4. The interface of claim 3 wherein the listing of all active alarms is divided into at least one of common control modules, common equipment modules or common process units.

5. The interface of claim 4 wherein the listing of all active alarms comprises a total active alarm listing and at least three sub-categories of alarms divided by one of common control modules, common equipment modules or common process units.

6. The interface of claim 1 further comprising a plurality of different operator definable display alerts for augmenting the plurality of alarm indicators.

7. The interface of claim 6 wherein one type of display alert comprises setting a target display alert for a target range for a process variable wherein the target display alert may begin immediately or after a delay and continue indefinitely or for a limited time and the target display alert provides an alarm when the target range is achieved or when the target range is not achieved within a preselected time period.

8. The interface of claim 6 wherein one type of display alert that comprises setting a range display alert for a desired value range for a process variable wherein the range display alert may begin immediately or after a delay and continue indefinitely or for a limited time and the range display alert provides an alarm when the process variable falls outside of the desired value range.

9. The interface of claim 6 wherein one type of display alert comprises setting a ramp display alert for a desired accumulated value for an output process variable wherein the ramp display alert provides an alarm when the actual accumulated value for the output process variable approaches and exceeds the desired accumulated value.

10. The interface of claim 1 wherein the plurality of alarm indicators are color-coded to provide an indication of alarm priority and alarm age.

11. The interface of claim 1 wherein the alarm profile display for the selected alarm includes additional information about the active alarm.

12. The interface of claim 11 further comprising parent control objects, wherein the main panel display and the alarm profile display are navigable to provide information about the parent control objects.

13. The interface of claim 1 wherein the interface is adaptable for PDA or handheld devices.

14. The interface of claim 6 further comprising summary displays for a plurality of the display alerts and the current status of all display alerts.

15. The interface of claim 1 further comprising hierarchical alarm profile displays indicating where and when a heaviest alarm activity is occurring.

16. The interface of claim 1 comprising graphical displays of active alarm counts vs. alarm age profiles.

17. The interface of claim 16 wherein the alarm profiles may be defined by at least one of time span, plant area, process unit and equipment modules.

18. A method for generating a graphical user interface for a process control system that includes a plurality of data inputs and a variety of alarms for said data inputs, the method comprising:
   displaying a main panel display including a plurality of alarm indicators, wherein each of the alarm indicators includes a visual representation of an active alarm for a data input from one or more of a control module, an equipment module, or a processing unit and provides indicia of alarm priority and alarm age, displaying an alarm profile display in response to selecting an alarm indicator from the main panel display, the alarm profile display providing contextual information corresponding to the selected alarm indicator, wherein the contextual information includes another alarm indicator to which the selected alarm indicator is a parent, the alarm profile display including a plurality of alarm profiles wherein active alarms are grouped by one or more of time span, plant area, process unit and equipment module, and superimposing the alarm profiles on a process graphic display so that the alarm profiles can be seen in the spatial context of equipment schematics depicted in the process graphic display.

19. The method of claim 18 further comprising simultaneously displaying the main panel display and the alarm profile display upon selecting the alarm indicator.

* * * * *

UNITED STATES PATENT AND TRADEMARK OFFICE
CERTIFICATE OF CORRECTION

PATENT NO. : 8,000,814 B2  
APPLICATION NO. : 10/574570  
DATED : August 16, 2011  
INVENTOR(S) : Robert B. Havekost et al.

Page 1 of 1

It is certified that error appears in the above-identified patent and that said Letters Patent is hereby corrected as shown below:

On the Title Page

Item (75), first named inventor, "Austin" should be -- Elgin --.

At Column 3, line 20, "a" should be -- an --.

At Column 4, line 39, "cornier" should be -- corner --.

At Column 6, line 32, "it's" should be -- its --.

At Column 6, line 35, "it's" should be -- its --.

At Column 6, line 52, "it's" should be -- its --.

At Column 6, line 57, "wont" should be -- won't --.

At Column 7, line 22, "it's" should be -- its --.

At Column 7, line 53, "faceplace" should be -- faceplate --.

At Column 7, lines 58-59, "so the confirms" should be -- so the display 25a confirms --.

At Column 8, line 26, "monitor" should be -- monitors --.

At Column 8, line 50, "oh" should be -- on --.

At Column 10, line 67, "a another" should be -- another --.

Signed and Sealed this  
Nineteenth Day of March, 2013

Teresa Stanek Rea  
*Acting Director of the United States Patent and Trademark Office*